(12) United States Patent
Kim et al.

(10) Patent No.: US 11,031,000 B2
(45) Date of Patent: **\*Jun. 8, 2021**

(54) METHOD AND DEVICE FOR TRANSMITTING AND RECEIVING AUDIO DATA

(71) Applicant: Samsung Electronics Co., Ltd., Suwon-si (KR)

(72) Inventors: Jae-deok Kim, Ansan-si (KR); Mee-jeong Park, Seoul (KR)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 16/719,002

(22) Filed: Dec. 18, 2019

(65) Prior Publication Data

US 2020/0118556 A1 Apr. 16, 2020

Related U.S. Application Data

(63) Continuation of application No. 15/848,967, filed on Dec. 20, 2017, now Pat. No. 10,546,578.

(30) Foreign Application Priority Data

Dec. 26, 2016 (KR) .......................... 10-2016-0179317
Nov. 8, 2017 (KR) .......................... 10-2017-0148328

(51) Int. Cl.
*G10L 15/22* (2006.01)
*G10L 15/26* (2006.01)
(Continued)

(52) U.S. Cl.
CPC ........ *G10L 15/1815* (2013.01); *G06F 40/289* (2020.01); *G06F 40/30* (2020.01);
(Continued)

(58) Field of Classification Search
CPC ........... G10L 15/26; G10L 15/18; H04W 4/15
See application file for complete search history.

(56) References Cited

U.S. PATENT DOCUMENTS 9,497,315 B1 11/2016 Pakidko et al.
9,686,404 B1 \* 6/2017 Pan .................... H04W 12/0608
(Continued)

FOREIGN PATENT DOCUMENTS

JP 2014-186713 A 10/2014
KR 10-1289081 B1 7/2013
(Continued)

OTHER PUBLICATIONS

European Search Report dated Nov. 20, 2019, issued in European Application No. 17887809.6-1207 / 3545519.

*Primary Examiner* — Shreyans A Patel
(74) *Attorney, Agent, or Firm* — Jefferson IP Law, LLP

(57) ABSTRACT

An artificial intelligence (AI) system configured to simulate functions of a human brain, such as recognition, determination, etc., by using a machine learning algorithm, such as deep learning, etc., and an application thereof. The AI system includes a method performed by a device to transmit and receive audio data to and from another device includes obtaining a voice input that is input by a first user of the device, obtaining recognition information indicating a meaning of the obtained voice input, transmitting the obtained voice input to the other device, determining (Continued)

whether an abnormal situation occurs, in which a second user of the other device does not understand the transmitted voice input, and transmitting the obtained recognition information to the other device, based on a result of the determination.

19 Claims, 13 Drawing Sheets

(51) Int. Cl.
*G10L 15/18* (2013.01)
*G06N 3/08* (2006.01)
*G06N 3/04* (2006.01)
*G10L 15/30* (2013.01)
*G06N 5/04* (2006.01)
*G06F 40/30* (2020.01)
*G06F 40/289* (2020.01)
*G10L 15/16* (2006.01)
*G10L 15/08* (2006.01)

(52) U.S. Cl.
CPC ............ *G06N 3/0445* (2013.01); *G06N 3/08* (2013.01); *G06N 5/04* (2013.01); *G10L 15/22* (2013.01); *G10L 15/26* (2013.01); *G10L 15/30* (2013.01); *G10L 15/16* (2013.01); *G10L 15/1822* (2013.01); *G10L 2015/088* (2013.01); *G10L 2015/223* (2013.01); *G10L 2015/228* (2013.01)

(56) References Cited

U.S. PATENT DOCUMENTS

| | | | |
|---|---|---|---|
| 9,946,842 B1* | 4/2018 | Stringham | G16H 80/00 |
| 2003/0081739 A1 | 5/2003 | Hikishima | |
| 2007/0112571 A1 | 5/2007 | Thirugnana | |
| 2007/0188901 A1 | 8/2007 | Heckerman et al. | |
| 2008/0177541 A1* | 7/2008 | Satomura | 704/251 |
| 2009/0222507 A1* | 9/2009 | Koseki | G06Q 10/00 709/202 |
| 2009/0234655 A1 | 9/2009 | Kwon | |
| 2009/0240488 A1* | 9/2009 | White | G10L 15/22 704/9 |
| 2010/0268534 A1 | 10/2010 | Kishan Thambiratnam et al. | |
| 2011/0060592 A1 | 3/2011 | Kang et al. | |
| 2013/0144603 A1 | 6/2013 | Lord et al. | |
| 2014/0142929 A1 | 5/2014 | Seide et al. | |
| 2017/0264735 A1* | 9/2017 | Terra Rios | H04W 4/14 |

FOREIGN PATENT DOCUMENTS

| | | |
|---|---|---|
| KR | 10-2015-0105559 A | 9/2015 |
| KR | 10-2016-0080711 A | 7/2016 |

* cited by examiner

METHOD AND DEVICE FOR TRANSMITTING AND RECEIVING AUDIO DATA

CROSS-REFERENCE TO RELATED APPLICATION(S)

This application is a continuation application of prior application Ser. No. 15/848,967, filed on Dec. 20, 2017, which claimed the benefit under 35 U.S.C. § 119(a) of a Korean patent application filed on Dec. 26, 2016 in the Korean Intellectual Property Office and assigned Serial number 10-2016-0179317, and of a Korean patent application filed on Nov. 8, 2017 in the Korean Intellectual Property Office and assigned Serial number 10-2017-0148328, the entire disclosure of each of which are hereby incorporated by reference.

TECHNICAL FIELD

The present disclosure relates to a method and a device for transmitting and receiving audio data. More particularly, the present disclosure relates to a method and a device for providing another device with recognition information indicating a meaning of a voice input of a user.

BACKGROUND

An artificial intelligence (AI) system is a computer system capable of simulating human intelligence. The AI system performs self-learning and determination, thereby becoming smarter, unlike previous rule-based smart systems. The more the AI system is used, the higher a recognition rate of the AI system becomes, and a user's taste becomes more accurately understood. Thus, the previous rule-based smart systems have been gradually replaced by the deep learning-based AI system.

The AI technology includes machine learning (deep learning) and element technologies utilizing the machine learning.

The machine learning is an algorithm technology that self-classifies and learns features of input data. The element technology is a technology configured to simulate functions of a human brain, such as recognition, determination, etc., by using the machine learning algorithm, such as deep learning, etc., and includes linguistic understanding, visual understanding, inference/prediction, knowledge expression, operation control, etc.

Various fields to which the AI technology is applied are as follows. Linguistic understanding is a technique of recognizing and applying/processing human languages/characters and includes natural language processing, machine translation, conversation systems, question and answer, voice recognition/synthesis, etc. Visual understanding is a technique of recognizing and processing an object like in human vision and includes object recognition, object tracking, image searching, human recognition, scene understanding, spatial understanding, image improvement, etc. Inference/prediction is a technique of determining and logically inferring and predicting information and includes inference based on knowledge/probability, optimized prediction, preference-based planning, recommendation, etc. Knowledge expression is a technique of performing automation to convert experiential information of a human being into knowledge data and includes knowledge establishment (data generation/classification), knowledge management (data utilization), etc. Operation control is a technique of controlling autonomous driving of a vehicle and motion of a robot and includes motion control (a steering method, collision, driving), manipulation control (behavior control), etc.

With developments in multimedia technologies and network technologies, users have been able to receive various services by using a device. In particular, as voice recognition technology has developed, users may provide a voice input to a device and the device my convert the voice input of the users into text.

However, based on the technology, it may be difficult for users to understand utterances of other users, because the users engaging in a conversation system have different nationalities, pronunciation characteristics, and language using habits according to the related art. Also, even if a device displays text indicating the utterances of the other users, the voice recognition model may not correctly convert the utterances into text indicating the meaning of the utterance. Accordingly, a technique is required to appropriately provide recognition information indicating a meaning of a voice input of a user by using a voice recognition model personalized for each user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for transmitting recognition information indicating a meaning of a voice input of a user without increasing network overhead, by accurately determining whether a situation occurs, in which another user does not understand the voice input of the user, by using a personalized artificial intelligence (AI) voice recognition model.

Additional aspects will be set forth in part in the description which follows and, in part, will be apparent from the description, or may be learned by practice of the presented embodiments.

In accordance with an aspect of the present disclosure, a device is provided. The device includes a user input interface configured to obtain a voice input that is input by a first user of the device, a communication interface configured to transmit the obtained voice input to another device, and a controller configured to obtain recognition information indicating a meaning of the obtained voice input and to determine whether an abnormal situation occurs, in which a second user of the other device does not understand the transmitted voice input, wherein the communication interface is further configured to transmit the obtained recognition information to the other device, based on a result of the determination.

In accordance with another aspect of the present disclosure, a method is provided. The method performed by a device, of transmitting and receiving audio data to and from another device, includes obtaining a voice input that is input by a first user of the device, obtaining recognition information indicating a meaning of the obtained voice input, transmitting the obtained voice input to the other device, determining whether an abnormal situation occurs, in which a second user of the other device does not understand the transmitted voice input, and transmitting the obtained recognition information to the other device, based on a result of the determination.

According to an aspect of another embodiment, a non-transitory computer-readable recording medium has embodied thereon a program for executing the method, performed by the device, of transmitting and receiving audio data to and from another device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

It will be understood that, although the terms first, second, etc., may be used herein to describe various elements, these elements should not be limited by these terms. These terms are only used to distinguish one element from another.

In this specification, a user input may include, for example, at least one of a touch input, a bending input, a voice input, a key input, and a multi-model input. However, the user input is not limited thereto. Hereinafter, the present disclosure will be described in detail by referring to the accompanying drawings.

Figure 1:
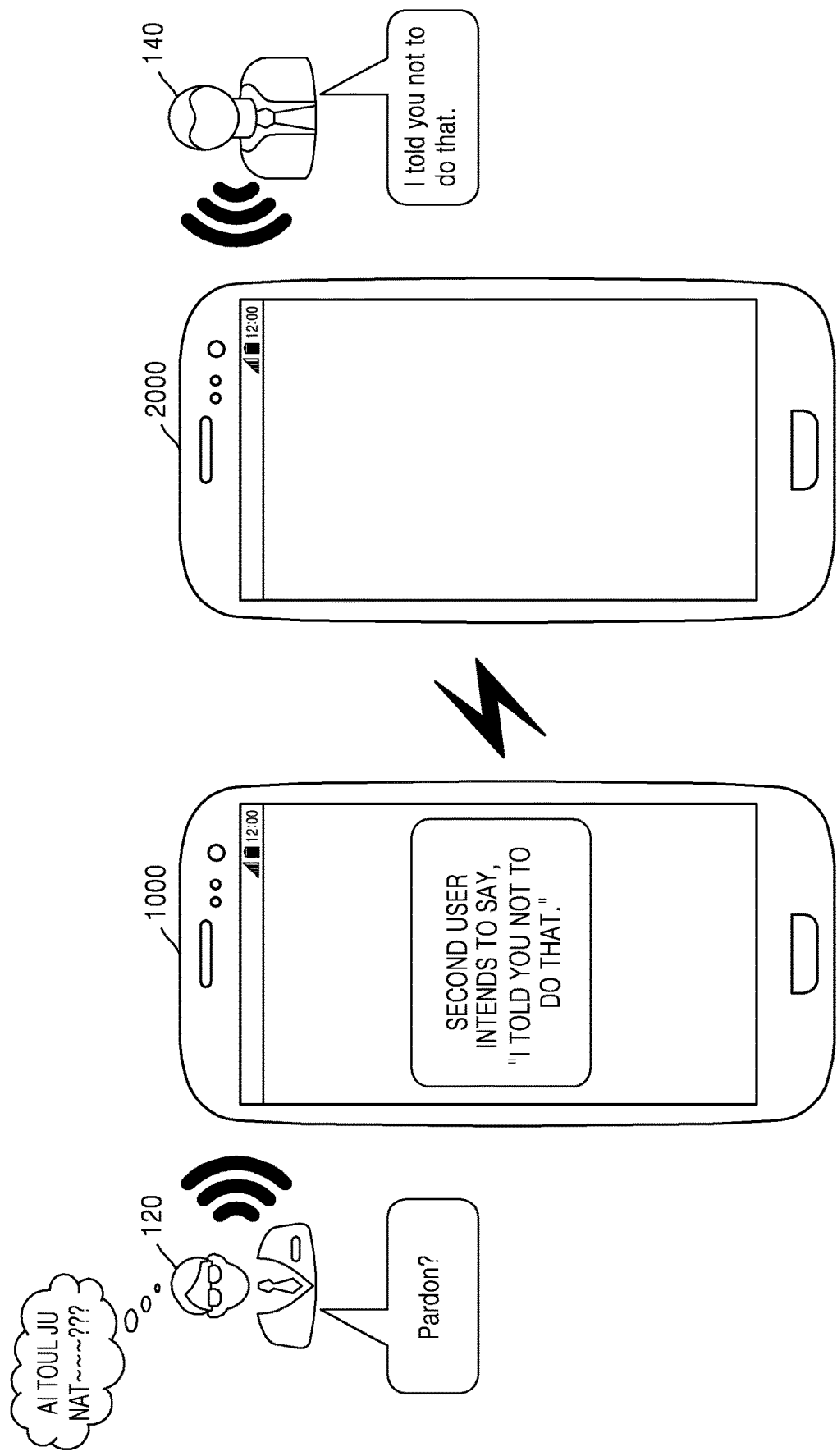
FIG. 1 is a view of an example in which a device provides a notification message with respect to reception of a voice from another device, according to an embodiment of the present disclosure.

FIG. 1 is a view of an example in which a device provides a notification message with respect to reception of a voice from another device, according to an embodiment of the present disclosure.

Referring to FIG. 1, a device 1000 may obtain at least one voice input which is input by a first user 120, and another device 2000 may obtain at least one voice input which is input by a second user 140. The device 1000 may transmit the obtained at least one voice input of the first user 120 to the other device 2000, and the other device 2000 may transmit the obtained at least one voice input of the second user 140 to the device 1000. For example, the device 1000 may receive the voice input of the second user 140, "I told you not to do that," from the other device 2000.

According to an embodiment, the device 1000 may transmit and receive the voice input to and from the other device 2000, when the device 1000 receives a request for a remote conference from the other device 2000. For example, the device 1000 may execute an application for the remote conference with the other device 2000 and may transmit and receive data to and from the other device 2000 via the executed application. In this specification, applications refer to a set of computer programs designed to execute specific operations. For example, the device 1000 may execute a phone application or a messenger application. Also, the device 1000 may transmit and receive audio data and text data to and from the other device 2000 via the executed application so that the first user 120 may converse with the second user 140.

According to an embodiment, the device 1000 may determine whether an abnormal situation occurs, in which the first user 120 does not understand the voice input of the second user 140, which is received from the other device 2000, and may receive recognition information indicating a meaning of the voice input of the second user 140, from the other device 2000.

The abnormal situation may include a case in which a meaning of a voice input of the other user is not understood, a case in which the meaning of the voice input of the other user is wrongly understood, a case in which the voice input of the other user is not heard, etc.

For example, the first user 120 may not hear the voice input of the second user 140, "I told you not to do that," and may utter "pardon?" For example, the device 1000 may obtain a voice input of the first user 120 "pardon?" with respect to the received voice input of the second user 140. Also, for example, the device 1000 may analyze a meaning of the voice input "pardon?" and may determine that the first user 120 does not understand the voice input of the second user 140. For example, the device 1000 may analyze the meaning of the voice input of the user by using at least one voice recognition technique from among speech to text (STT), automatic speech recognition (ASR), spoken language understanding (SLU), and natural language understanding (NLU). However, the present disclosure is not limited thereto.

For example, when the device 1000 determines that the first user 120 does not understand the voice input of the second user 140, the device 1000 may request the other device 2000 to transmit recognition information indicating a meaning of the voice input of the second user 140. For example, the other device 2000 may transmit the recognition information, "I told you not to do that," obtained by the other device 2000, to the device 1000, in response to the request of the device 1000.

The recognition information may be information indicating a meaning of at least one voice input, wherein the information is generated from the at least one voice input of a user by using at least one technique from among STT, ASR, SLU, and NLU. For example, the recognition information may include text indicating the meaning of the voice input of the user, the text being generated by using an artificial intelligence (AI) voice recognition model configured to interpret the voice input of the user.

According to an embodiment, in order to generate the recognition information, a personalized AI voice recognition model, which is different for each user, may be used. For example, the device 1000 may use a first AI voice recognition model of the first user 120 to interpret the voice input of the first user 120, and the other device 2000 may use a second AI voice recognition model of the second user 140 to interpret the voice input of the second user 140. For example, the first AI voice recognition model may be generated in the device 1000 and registered in the device 1000. Alternatively, for example, the first AI voice recognition model may be generated in another device (not shown) of the first user 120 and provided to the device 1000. Alternatively, for example, the first AI voice recognition model may be generated in a server (not shown) and learned by the device 1000.

According to an embodiment, the device 1000 may provide a notification message notifying a portion that the first user 120 does not understand, based on the recognition information received from the other device 2000. For example, the device 1000 may provide the notification message, "the second user intends to say, "I told you not to do that," to the first user 120, based on the recognition information, "I told you not to do that," received from the other device 2000.

The notification message may be digital information generated based on the recognition information and provided to the user to notify the voice input of the other user that the user does not understand. In this specification, the notification message may be provided to the user in a certain format, such as text, image, audio, or video, or in a format combining at least two thereof. However, the notification message is not limited thereto.

The device 1000 may include smartphones, tablet personal computers (PCs), PCs, smart televisions (TVs), cellular phones, personal digital assistants (PDAs), laptop computers, media players, micro servers, global positioning system (GPS) devices, electronic book terminals, digital broadcasting terminals, navigation devices, kiosks, moving picture experts group phase 1 or phase 2 (MPEG-1 or MPEG-2) audio layer 3 (MP3) players, digital cameras, home appliances, and other mobile or non-mobile computing devices, but is not limited thereto. Also, the device 1000 may include wearable devices having a communication function and a data processing function, such as watches, glasses, hair bands, rings, etc. However, the device 1000 is not limited thereto, and may include all types of devices configured to transmit and receive voice data and text data to and from the other device 2000.

Also, the device 1000 may communicate with a server (not shown) and the other device 2000 via a predetermined network to transmit and receive voice data and text data. In this case, the predetermined network may include a local area network (LAN), a wide area network (WAN), a value-added network (VAN), a mobile radio communication network, a satellite communication network, and combinations thereof. The network may be a comprehensive data communication network configured to enable components included in the network to smoothly communicate with one another, and may include the wired Internet, the wireless Internet, and a mobile wireless communication network. The wireless communication may include, for example, wireless LAN (Wi-Fi), Bluetooth, Bluetooth low energy, Zigbee, Wi-Fi direct (WFD), ultra wideband (UWB), infrared data association (IrDA), near-field communication (NFC), etc., but is not limited thereto.

The remote conference may have problems, such as a delay of voice transmission due to a delay of a network, degradation of a voice quality, etc. However, according to the present disclosure, content of the conference is managed and exchanged as text, and thus, data loads may be reduced.

Figure 2:
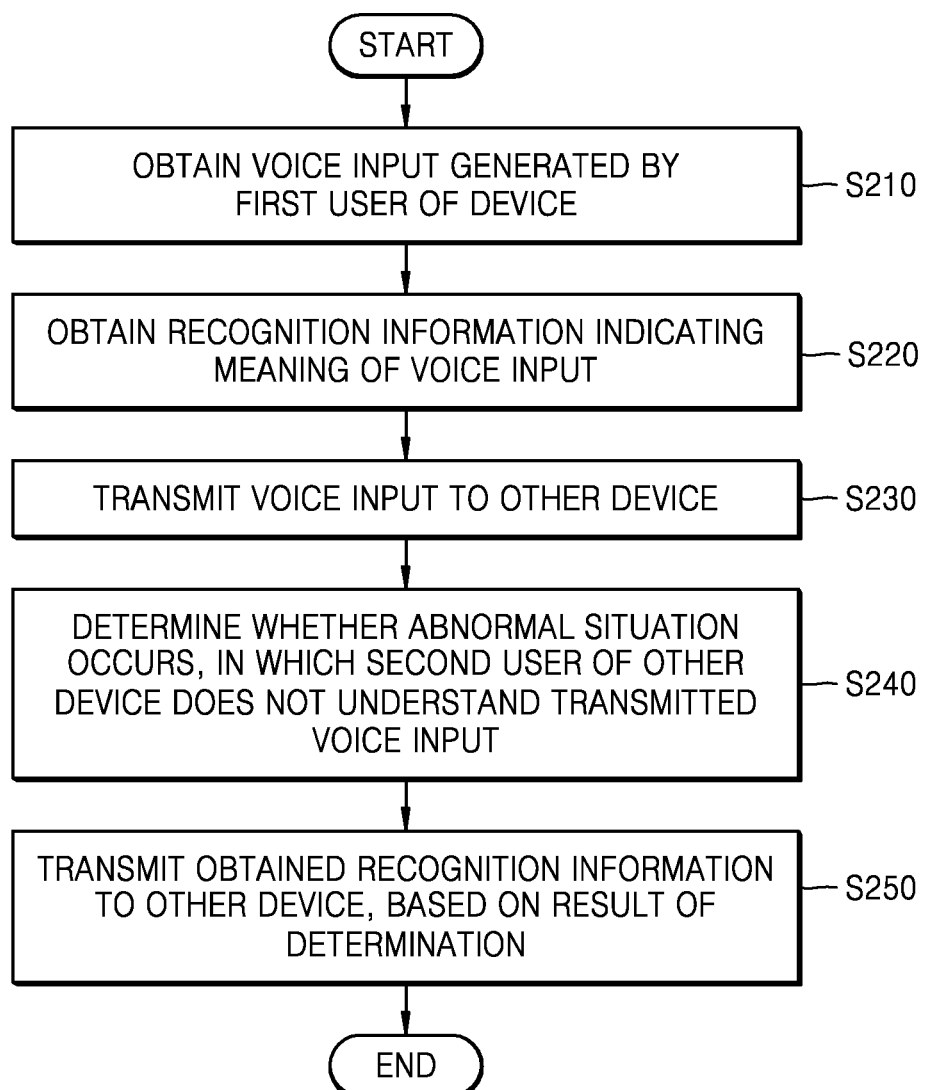
FIG. 2 is a flowchart of a method performed by a device to transmit recognition information to another device, according to an embodiment of the present disclosure.

FIG. 2 is a flowchart of a method performed by a device to transmit recognition information to another device, according to an embodiment of the present disclosure.

Referring to FIG. 2, in operation S210, the device 1000 may obtain a voice input that is input by a first user of the device 1000.

According to an embodiment, the first user may execute a voice recognition application and generate a voice to input the voice in the device 1000. For example, the first user may input the voice via a microphone of the device 1000.

Alternatively, the device 1000 may always be in a state configured to receive a voice input of the user. For example, the device 1000 may receive the voice input which is generated by the user while an application (for example, a phone application, a messenger application, etc.) for a remote conference is executed.

In operation S220, the device 1000 may obtain recognition information indicating a meaning of the voice input that is input by the first user.

The recognition information may be information indicating a meaning of at least one voice input of the user, wherein the information is generated from the at least one voice input of the user by using at least one technique from among STT, ASR, SLU, and NLU. For example, the recognition information may include text indicating the meaning of the voice input of the user, the text being generated by using an AI voice recognition model configured to interpret the voice input of the user.

According to an embodiment, the device 1000 may obtain a first AI voice recognition model to interpret the voice input of the first user, and may use the first AI voice recognition model to generate text indicating a meaning of the first voice input. For example, the first AI voice recognition model may be learned by using voice data of the first user, and the intonation of the first user and/or pronunciation characteristics of the first user may be reflected in the first AI voice recognition model.

In operation S230, the device 1000 may transmit the voice input that is input by the first user to the other device 2000.

According to an embodiment, the device 1000 may directly transmit the voice input of the first user to the other device 2000. Alternatively, according to an embodiment, the device 1000 may transmit the voice input of the first user to the other device 2000 through a server. Also, the device 1000 may communicate with the server and/or the other device 2000 via a predetermined network, in order to transmit the voice data to the other device 2000.

In operation S240, the device 1000 may determine whether an abnormal situation occurs, in which a second user of the other device 2000 does not understand the transmitted voice input.

According to an embodiment, the device 1000 may receive a voice input of the second user from the other device 2000. For example, the device 1000 may receive the voice input of the second user from the other device 2000, in correspondence to the transmission of the voice input of the first user to the other device 2000.

According to an embodiment, the device 1000 may determine whether the abnormal situation occurs, by analyzing at least one voice input of the second user, which is received from the other device 2000. For example, the device 1000 may convert the received at least one voice input of the second user into text, and based on whether a predetermined phrase is included in the converted text, may determine whether the abnormal situation occurs. For example, the predetermined phrase may indicate that the second user does not understand the voice input of the first user and may be pre-stored in the device 1000. For example, the predetermined phrase may include "pardon?", "could you say it again?", "I don't understand what you're saying," "pardon? I didn't get it," etc., but is not limited thereto.

According to an embodiment, the device 1000 may determine that the abnormal situation occurs by receiving a request of transmitting the recognition information from the other device 2000. For example, when the other device 2000 determines that the second user of the other device 2000 does not understand the voice input of the first user, the other device 2000 may request the device 1000 to transmit the recognition information indicating the meaning of the voice input of the first user. For example, based on the request of the other device 2000, the device 1000 may determine that the abnormal situation occurs.

According to an embodiment, the device 1000 may receive, from the other device 2000, recognition information indicating a meaning of the voice input of the second user, which is input by the second user to the other device 2000. For example, when an application for a remote conference is executed, the device 1000 may intermittently receive the recognition information indicating the meaning of the voice input of the second user from the other device 2000 without an additional request. Also, the device 1000 according to an embodiment may analyze content of a conversation between the first user and the second user, based on the recognition information indicating the meaning of the voice input of the first user and the recognition information indicating the meaning of the voice input of the second user. Also, the device 1000 according to an embodiment may determine whether the abnormal situation occurs, based on the analyzed content of the conversation.

Examples in which whether the abnormal situation occurs is determined will be described in detail with reference to FIGS. 4 and 5.

In operation S250, the device 1000 may transmit obtained recognition information to the other device 2000, based on a result of the determination.

According to an embodiment, the device 1000 may directly transmit the recognition information to the other device 2000. Alternatively, according to an embodiment, the device 1000 may transmit the recognition information to the other device 2000 via the server. Also, the device 1000 may communicate with the server and/or the other device 2000 via the predetermined network, in order to transmit text data to the other device 2000.

Figure 3:
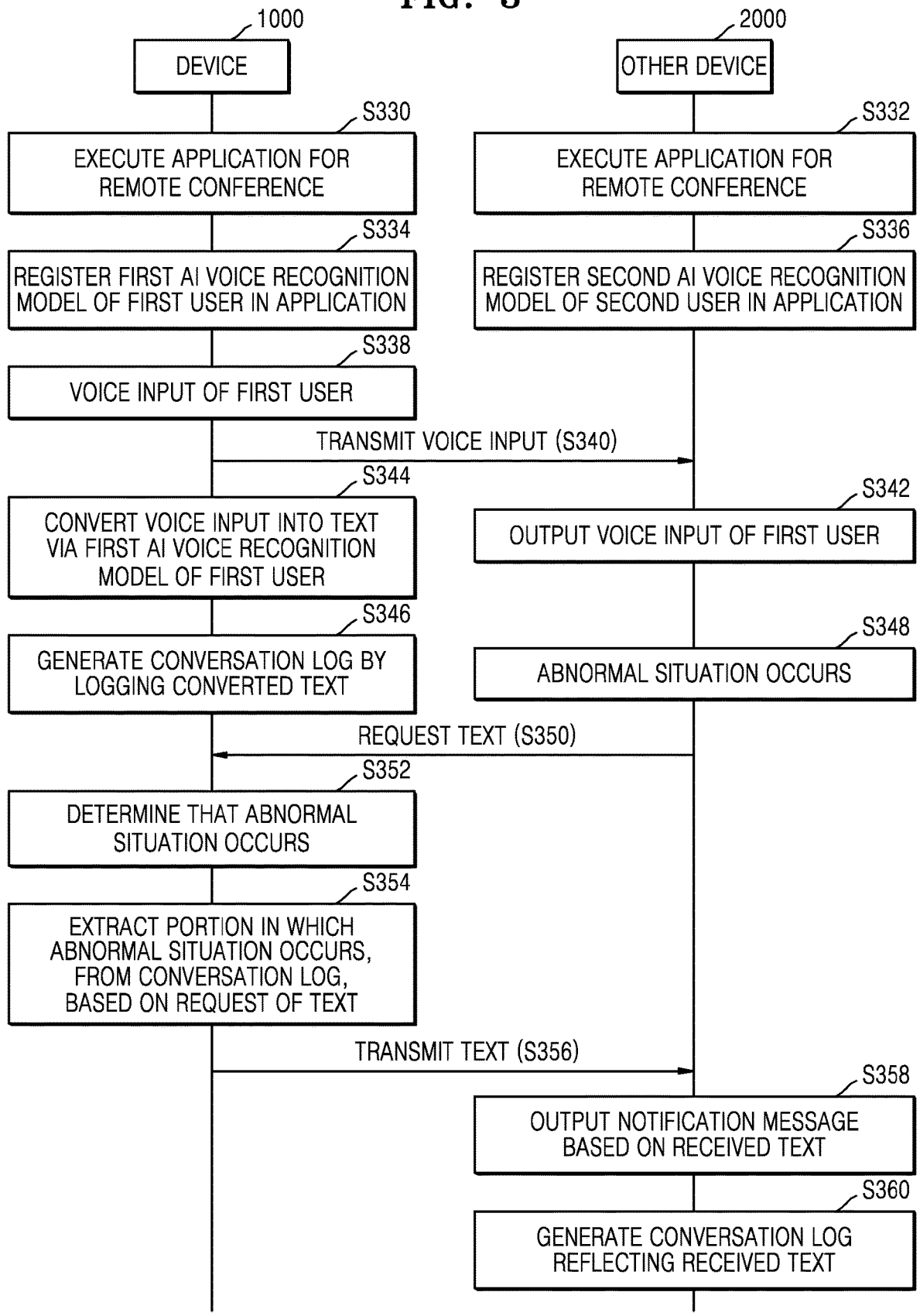
FIG. 3 is a flowchart of a method of transmitting and receiving data between a device and another device, according to an embodiment of the present disclosure.

FIG. 3 is a flowchart of a method of transmitting and receiving data between a device and another device 2000, according to an embodiment of the present disclosure.

Referring to FIG. 3, in operation S230, the device 1000 may execute an application for a remote conference.

According to an embodiment, the device 1000 may execute the application for the remote conference by receiving a user input of the first user for the execution of the application for the remote conference. According to an embodiment, after executing the application, the device 1000 may transmit a request to participate in the remote conference, to the other device 2000, based on a user input of the first user.

In operation S332, the other device 2000 may execute the application for the remote conference.

According to an embodiment, the other device 2000 may execute the application for the remote conference by receiving a user input of the second user for the execution of the application for the remote conference.

According to an embodiment, the other device 2000 may participate in the conference including the first user, in response to the request to participate in the conference, which is received from the device 1000. For example, the other device 2000 may execute the application for the remote conference, based on the user input of the second user for responding to the conference participation request.

In operation S334, the device 1000 may register the first AI voice recognition model of the first user in the application for the remote reference.

According to an embodiment, the device 1000 may register the first AI voice recognition model in the application, in order to convert a voice input generated by the first user to text via the first AI voice recognition model. For example, the first AI voice recognition model may be learned by using voice data of the first user and may reflect the intonation of the first user and/or pronunciation characteristics of the first user.

According to an embodiment, the first AI voice recognition model may be a set of algorithms configured to interpret the voice input of the first user by using statistical results of machine learning. For example, the first AI voice recognition model may have the voice input of the first user as an input and may have text indicating a meaning of the voice input of the first user as an output. For example, the first AI voice recognition model may be generated in the device 1000 and the registered in the device 1000. Alternatively, for example, the first AI voice recognition model may be generated in another device (not shown) of the first user and provided to the device 1000. Alternatively, for example, the first AI voice recognition model may be generated in a server (not shown) and learned in the device 1000.

In operation S336, the other device 2000 may register a second AI voice recognition model of the second user in the application for the remote conference.

According to an embodiment, the other device 2000 may register the second AI voice recognition model in the application, in order to convert a voice input generated by the second user to text via the second AI voice recognition model. For example, the second AI voice recognition model may be learned by using voice data of the second user and may reflect the intonation and/or pronunciation characteristics of the second user.

According to an embodiment, the second AI voice recognition model may a set of algorithms configured to interpret the voice input of the second user by using statistical results of machine learning. For example, the second AI voice recognition model may have the voice input of the second user as an input and may have text indicating a meaning of the voice input of the second user as an output. For example, the second AI voice recognition model may be generated in the other device 2000 and the registered in the other device 2000. Alternatively, for example, the second AI voice recognition model may be generated in another device (not shown) of the second user and provided to the other device 2000. Alternatively, for example, the second AI voice recognition model may be generated in a server (not shown) and learned in the other device 2000.

In operation S338, the device 1000 may obtain the voice input of the first user.

Operation S338 corresponds to operation S210 of FIG. 2, and thus, its description will be omitted.

In operation S340, the device 1000 may transmit the obtained voice input of the first user to the other device 2000.

Operation S340 corresponds to operation S230 of FIG. 2, and thus, its description will be omitted.

In operation S342, the other device 2000 may output the received voice input of the first user.

According to an embodiment, in order to transmit the voice input of the first user to the second user, the other device 2000 may output the voice input of the first user received from the device 1000 as an audio signal.

In operation S344, the device 1000 may convert the obtained voice input of the first user into text by using the first AI voice recognition model.

According to an embodiment, the device 1000 may generate the text indicating a meaning of the voice input of the first user by using the first AI voice recognition model, in order to interpret the voice input of the first user. According to an embodiment, when the voice input of the first user is input to the first AI voice recognition model, the voice input of the first user may be converted into the text, while the voice input is not converted into text via the second AI voice recognition model.

In operation S346, the device 1000 may log the converted text and generate a conversation log.

According to an embodiment, the device 1000 may convert the voice input of the first user into text in real time from a time point in which the first user starts to participate in a conversation, and may log the text in due course. According to an embodiment, the conversation log generated by the device 1000 by logging information may include various information which may be obtained by the device 1000 during the conversation. For example, the conversation log of the first user may include names of users participating in the conversation, a time at which the first user generates a voice, the text generated based on the voice input of the first user up to now, etc.

In operation S348, the other device 2000 may determine whether an abnormal situation occurs, in which the second user does not understand the voice input of the first user.

According to an embodiment, the other device 2000 may determine whether the abnormal situation occurs, by analyzing at least one voice input of the second user. For example, the other device 2000 may determine whether the abnormal situation occurs, based on whether a predetermined phrase is included in the text which is converted via the second AI voice recognition model. For example, the predetermined phrase includes content that the second user does not understand the voice input of the first user, and may be pre-stored in the other device 2000. For example, the predetermined phrase may include "pardon?", "could you say it again?", "I don't understand what you're saying," and "pardon? I didn't get it," etc., but is not limited thereto.

As another example, the other device 2000 may analyze the text converted by using the second AI voice recognition model, and may recognize whether the second user identifies a meaning of the voice input of the first user, when the second user repeatedly generates similar words or phrases. The other device 2000 may determine that the abnormal situation occurs, in which the second user does not understand the meaning of the voice input of the first user, even if the second user does not explicitly express that the second user does not understand the meaning of the voice input of the first user.

In operation S350, when the other device 2000 determines that the abnormal situation occurs, the other device 2000 may request the text indicating the meaning of the received voice input of the first user, from the device 1000.

According to an embodiment, the other device 2000 may request, from the device 1000, text corresponding to voice inputs of the first user generated within a predetermined range of a time period including a time point in which the abnormal situation occurs, from among voice inputs of the first user received from the device 1000, as the conference is started.

In operation S352, the device 1000 may determine that the abnormal situation occurs, in which the second user does not understand the voice input of the first user.

According to an embodiment, the device 1000 may determine that the abnormal situation occurs, in which the second user does not understand the voice input of the first user, by receiving, from the other device 2000, the request of transmitting the text. However, methods performed by the device 1000 to determine that the abnormal situation occurs are not limited thereto.

In operation S354, the device 1000 may extract a portion of the conversation log, in which the abnormal situation occurs, in response to the request of the other device 2000 to transmit the text.

According to an embodiment, the device 1000 may extract, from the conversation log, the text corresponding to the voice inputs of the first user generated within the predetermined range of the time period including the time point, in which it is determined that the abnormal situation occurs, as the portion in which the abnormal situation occurs. For example, the time point in which it is determined that the abnormal situation occurs may be different between the device 1000 and the other device 2000, and may be based on the device 1000 or the other device 2000, which may be pre-set in the application for the remote reference. For example, when the predetermined range is set based on the time point in which it is determined that the abnormal situation occurs, the time point being determined by the other device 2000, the device 1000 may receive, from the other device 2000, information of the time point in which it is determined that the abnormal situation occurs, along with the request of transmitting the text.

In operation S356, the device 1000 may transmit text indicating the meaning of the voice input of the first user, to the other device 2000.

According to an embodiment, the device 1000 may transmit, to the other device 2000, the portion of the conversation log, in which the abnormal situation occurs, based on the request of transmitting the text from the other device 2000.

In operation S358, the other device 2000 may output a notification message based on the received text.

According to an embodiment, the other device 2000 may output the notification message notifying the portion that the second user does not understand, based on the text received from the device 1000. For example, the other device 2000 may output the notification message that "the first user said "AAA," based on the text "AAA" received from the device 1000. For example, the notification message may be output in a format of voice or text, but is not limited thereto.

In operation S360, the other device 2000 may generate a conversation log reflecting the received text.

According to an embodiment, the other device 2000 may generate the conversation log including not only content of the voice input of the second user, but also content related to the abnormal situation, the time point in which the abnormal situation occurs, and the text received from the device 1000.

Orders of Operations S330 through S360 may be changed, or one or more operations may be omitted. However, the present disclosure is not limited thereto. Also, the operations performed in the device 1000 may be performed in the other device 2000, and the operations performed in the device 2000 may be performed in the device 1000.

It is described with reference to FIG. 3 that the first user and the second user converse with each other by executing the application for the remote conference. However, the present disclosure is not limited thereto. Audio data may be transmitted and received, and when an abnormal situation occurs, text data may be transmitted and received, and notification messages are output and reflected in conversation logs, in various applications for voice conversations between users and phone applications.

Figure 4:
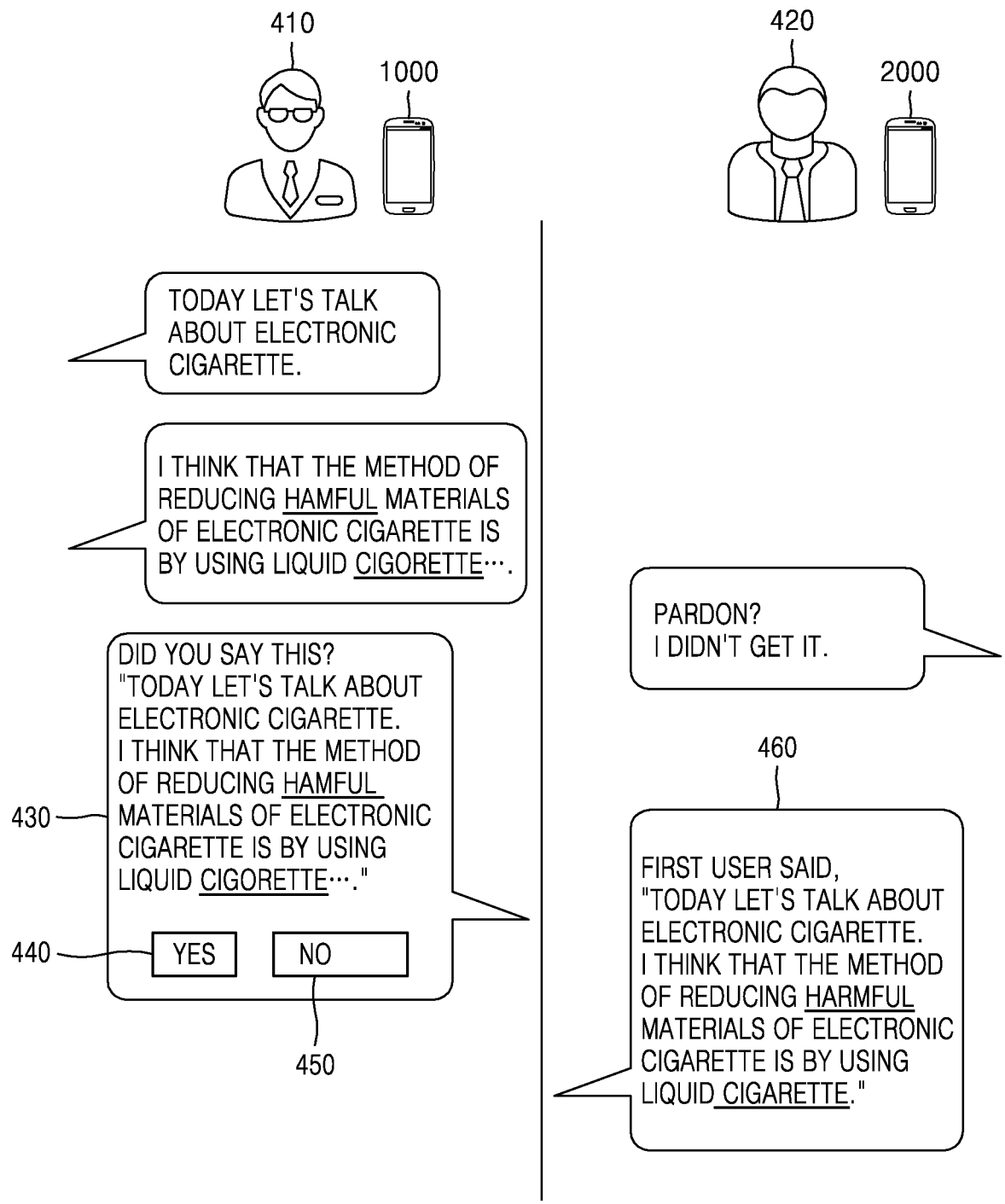
FIG. 4 is a view of an example in which it is determined that an abnormal situation occurs, according to an embodiment of the present disclosure.

FIG. 4 is a view of an example in which it is determined that an abnormal situation occurs, according to an embodiment of the present disclosure.

Referring to FIG. 4, during a conversation, the device 1000 may determine that the abnormal situation occurs, in which a second user 420 does not understand a voice input of a first user 410, by analyzing at least one voice input of the second user 420 received from the other device 2000.

According to an embodiment, the device 1000 may convert the received at least one voice input of the second user 420 into text and based on whether a predetermined phrase is included in the converted text, may determine whether the abnormal situation occurs. For example, as a response to a voice input generated by the first user 410, "I think that the method of reducing harmful materials of an electronic cigarette includes using a liquid cigarette," the device 1000 may receive a voice input of the second user 420, "pardon? I didn't get it." For example, the device 1000 may convert the received user input of the second user 420 into text by using a first AI voice recognition model and may recognize that the text includes a predetermined phrase, "I didn't get it." For example, the device 1000 may determine that the abnormal situation occurs, when the predetermined phrase is included in the text.

According to another embodiment, the device 1000 may determine that the abnormal situation occurs, in which the second user 420 does not understand the voice input of the first user 410, by receiving recognition information indicating a meaning of the voice input of the second user 420, which is input to the other device 2000. For example, when an application for a remote conference is executed, the device 1000 may intermittently receive the recognition information indicating the meaning of the voice input of the second user 420 from the other device 2000, without an additional request. Also, for example, the device 1000 may determine whether the abnormal situation occurs, based on whether the predetermined phrase is included in the received recognition information. For example, when the device 1000 receives the recognition information indicating the meaning of the voice input of the second user 420, "pardon? I didn't get it," the device 1000 may recognize that the predetermined phrase "I didn't get it" is included in the text and may determine that the abnormal situation occurs.

According to an embodiment, when it is determined that the abnormal situation occurs, the device 1000 may display a check message 430 on a screen of the device 1000.

The check message 430 may denote digital information provided to a user to check whether the recognition information indicates the meaning of the voice input of the user. In this specification, the check message 430 may be provided to the user in a certain format, such as text, image, audio, and video, or in a format combining at least two thereof. However, the check message 430 is not limited thereto.

For example, with respect to the voice input generated by the first user 410, "I think that the method of reducing harmful materials of an electronic cigarette is by using a liquid cigarette," the check message 430 may be output to check whether the recognition information obtained by using the first AI voice recognition model, "I think that the method of reducing hamful materials of an electronic cigarette is by using a liquid cigorette," correctly indicates the meaning of the voice input of the first user 410.

According to an embodiment, the device 1000 may generate the check message 430 based on the obtained recognition information. For example, the check message 430 may include a phrase, "did you say this?", the obtained recognition information, and an object to perform a specific operation.

Also, according to an embodiment, the device 1000 may correct the recognition information, based on an input of the first user 410 for correcting the recognition information, generated in response to the displayed check message 430. For example, the device 1000 may receive a user input of selecting a "YES" icon 440 for correcting the recognition information, and may activate an edit function of the check message 430. Also, the device 1000 may receive a user input of correcting the recognition information as "I think that the method of reducing harmful materials of an electronic cigarette is by using a liquid cigarette." Also, according to an embodiment, the device 100 may transmit the corrected recognition information to the other device 2000.

Alternatively, according to an embodiment, the device 1000 may receive an input of the first user 410 for not correcting the recognition information, generated in response to the displayed check message 430. For example, the device 1000 may receive a user input of selecting a "NO" icon 450 for not correcting the recognition information, and may transmit, to the other device 2000, the recognition information that is not corrected.

Also, according to an embodiment, the other device 2000 may output a notification message 460, based on the corrected recognition information. For example, the other device 2000 may provide the notification message, "the first user said, "I think that the method of reducing harmful materials of an electronic cigarette is by using a liquid cigarette,"" to the second user 420, based on the corrected recognition information received from the device 1000, "I think that the method of reducing harmful materials of an electronic cigarette is by using a liquid cigarette."

Figure 5:
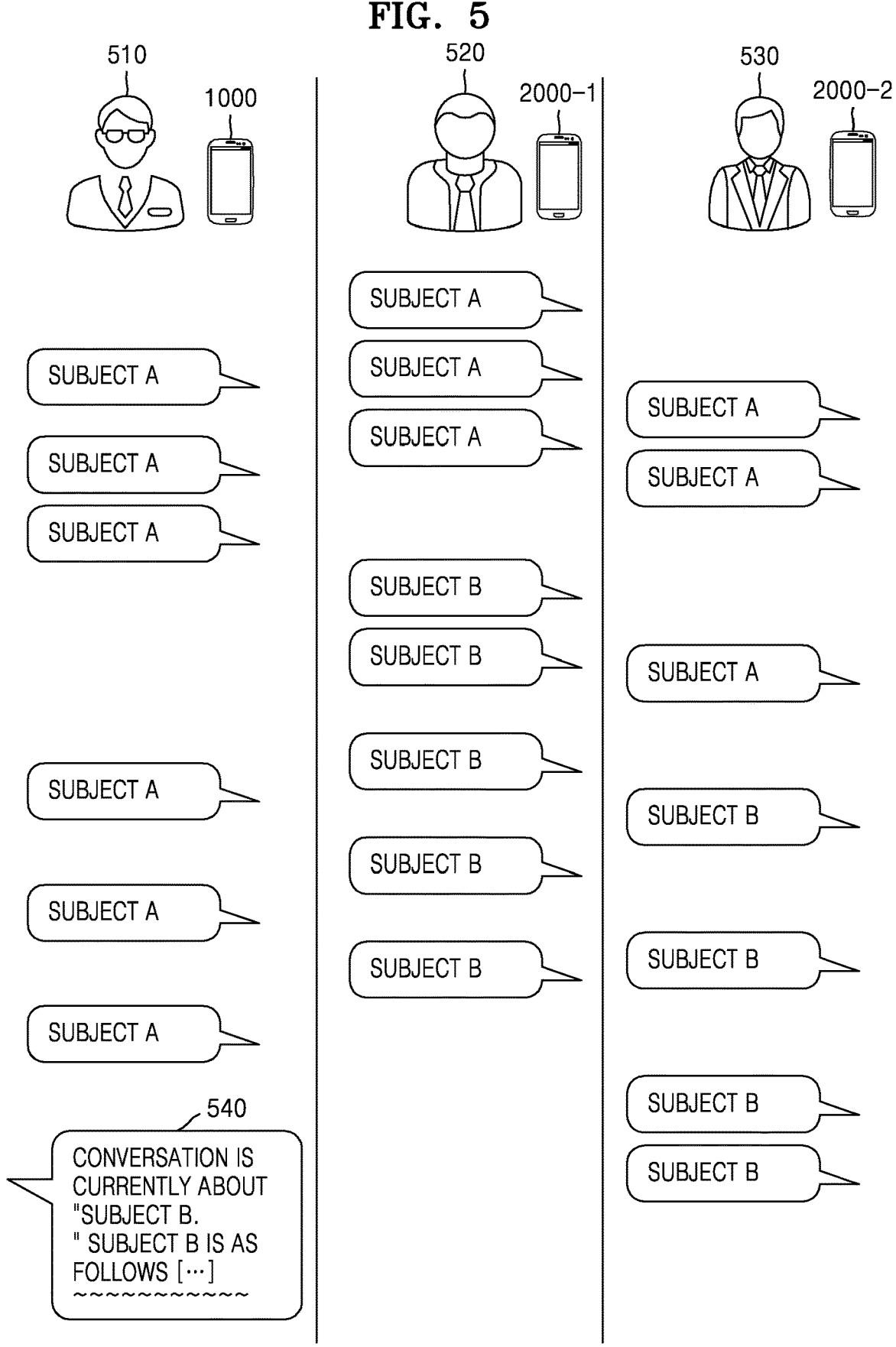
FIG. 5 is a view of an example in which it is determined that an abnormal situation occurs, according to an embodiment of the present disclosure.

FIG. 5 is a view of an example in which it is determined that an abnormal situation occurs, according to an embodiment of the present disclosure.

Referring to FIG. 5, the device 1000 may receive recognition information indicating a meaning of a voice input of a second user 520 and recognition information indicating a meaning of a voice input of a third user 530, from a first other device 2000-1 and a second other device 2000-2. For example, when an application for a remote conference is executed, the device 1000 may intermittently receive the recognition information indicating the meaning of the voice input of the second user 520 and the recognition information indicating the meaning of the voice input of the third user 530 from the first other device 2000-1 and the second other device 2000-2, without an additional request.

Also, the device 1000 according to an embodiment may analyze content of a conversation among a first user 510, the second user 520, and the third user 530, based on recognition information indicating a meaning of a voice input of the first user 510, the recognition information indicating the meaning of the voice input of the second user 520, and the recognition information indicating the meaning of the voice input of the third user 530. For example, the device 1000 may analyze the content of the conversation to determine a conversation subject and may determine that only the second user 520 and the third user 530 change the conversation subject to subject B, while the first user 510, the second user 520, and the third user 530 talk about subject A.

Also, the device 1000 according to an embodiment may determine that the abnormal situation occurs based on the analyzed content of the conversation. For example, the device 1000 may determine that the abnormal situation occurs, by determining that the first user 510 speaks about a subject that is different from a subject of the other users 520 and 530, for a period of time equal to or greater than a predetermined period of time.

According to an embodiment, the device 1000 may provide a notification message 540 configured to notify a current conversation subject to the first user 510, based on the analyzed content of the conversation. For example, the device 1000 may provide the notification message 540, "the conversation is currently about subject B. Subject B is as follows [ . . . ]," to the first user 510. For example, the device 1000 may output the notification message 540 in a format of text or sound.

According to an embodiment, the device 1000 may change the predetermined period of time, based on learning. For example, when there are a number of times in the previous conferences when the first user 510 spoke about a different subject, the device 1000 may reduce the period of time on which determination of whether the voice input of the first user 510 deviates from the conversation subject is based.

According to an embodiment, the first other device 2000-1 and the second other device 2000-2 may be included in the other device 2000 described above and to be described below.

Figure 6:
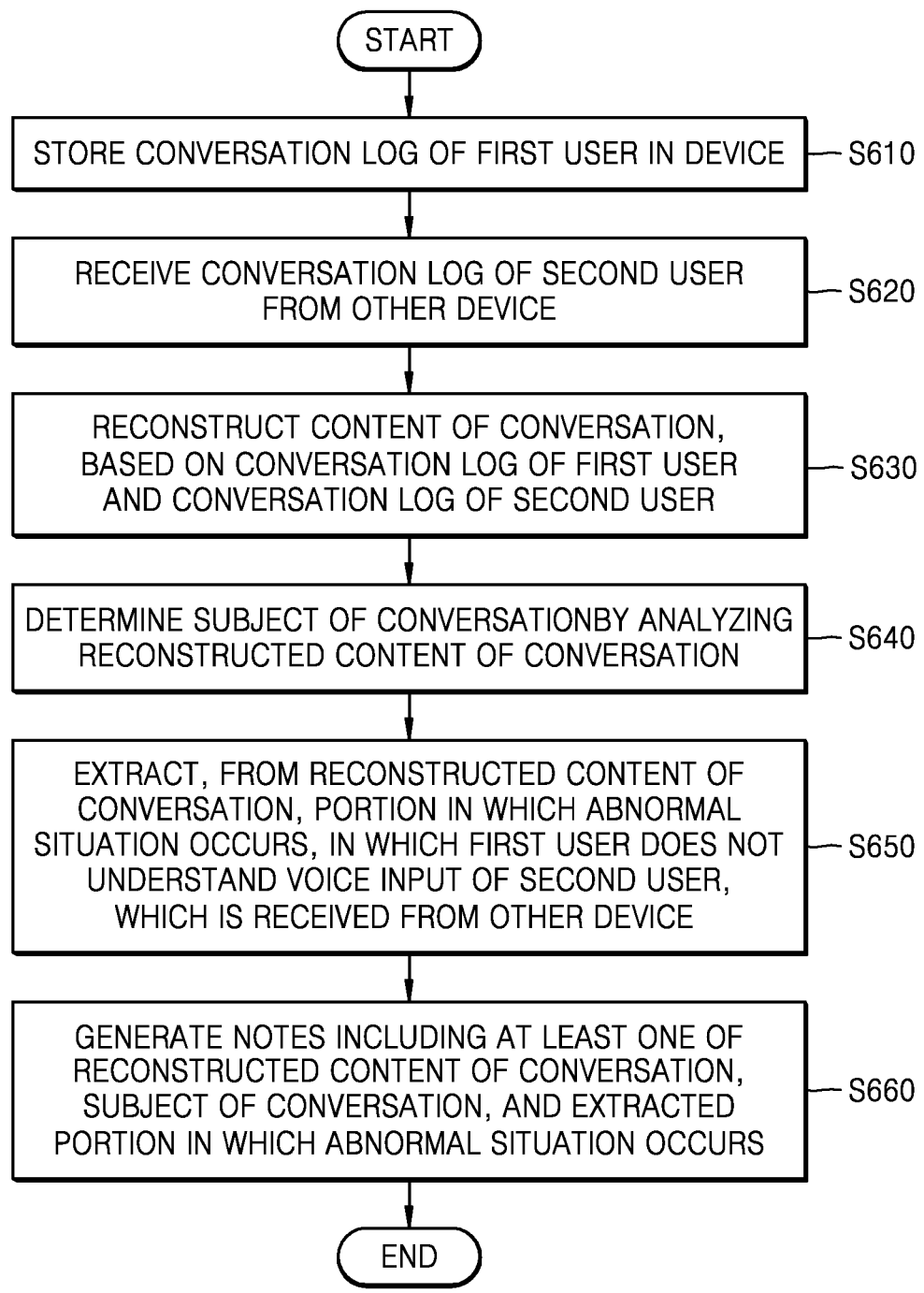
FIG. 6 is a view of an example in which a device generates notes, according to an embodiment of the present disclosure.

FIG. 6 is a view of an example in which a device generates notes, according to an embodiment of the present disclosure.

Referring to FIG. 6, in operation S610, the device 1000 may store a conversation log of a first user in the device 1000.

According to an embodiment, when a remote conference is completed, the device 1000 may store the conversation log of the first user in a memory, based on at least one piece of recognition information obtained via at least one voice input of the first user. For example, the conversation log of the first user may include text converted from all the voice inputs of the first user generated during the conference via a first AI voice recognition model, and time information in which the voice inputs of the first user are generated. According to an embodiment, when the first user leaves the conference, even if the conference is not completed, the device 1000 may store the conversation log of the first user in the memory, based on the obtained at least one piece of recognition information.

In operation S620, the device 1000 may receive a conversation log of a second user from the other device 2000.

According to an embodiment, when the remote conference is completed, the other device 2000 may generate the conversation log of the second user, based on at least one piece of recognition information obtained via at least one voice input of the second user. Also, according to an embodiment, the device 1000 may receive the generated conversation log of the second user from the other device 2000. For example, the conversation log of the second user may include text converted from all the voice inputs of the second user generated during the conference via a second AI voice recognition model, and time information in which the voice inputs of the second user are generated.

In operation S630, the device 1000 may reconstruct conversation content based on the conversation log of the first user and the conversation log of the second user.

According to an embodiment, the device 1000 may reconstruct the conversation log of the first user and the conversation log of the second user as a form in which the first user and the second user converse with each other, based on the time in which the voice input of the first user is generated and the time in which the voice input of the second user is generated.

In operation S640, the device 1000 may determine a conversation subject by analyzing the reconstructed conversation content.

According to an embodiment, the device 1000 may summarize a portion commonly talked about by the first user and the second user, from the reconstructed conversation content, and may extract the conversation subject.

In operation S650, the device 1000 may extract, from the reconstructed conversation content, a portion in which an abnormal situation occurs, in which the first user does not understand the voice input of the second user received from the other device 2000.

According to an embodiment, the device 1000 may extract, from the reconstructed conversation content, the portion in which the abnormal situation occurs via a record of time in which it is determined that the abnormal situation occurs, in which the first user does not understand the voice input of the second user.

In operation S660, the device 1000 may generate the notes of the first user including at least one of the reconstructed conversation content, the conversation subject, and the portion in which the abnormal situation occurs.

The notes will be described in detail with reference to FIG. 7.

Figure 7:
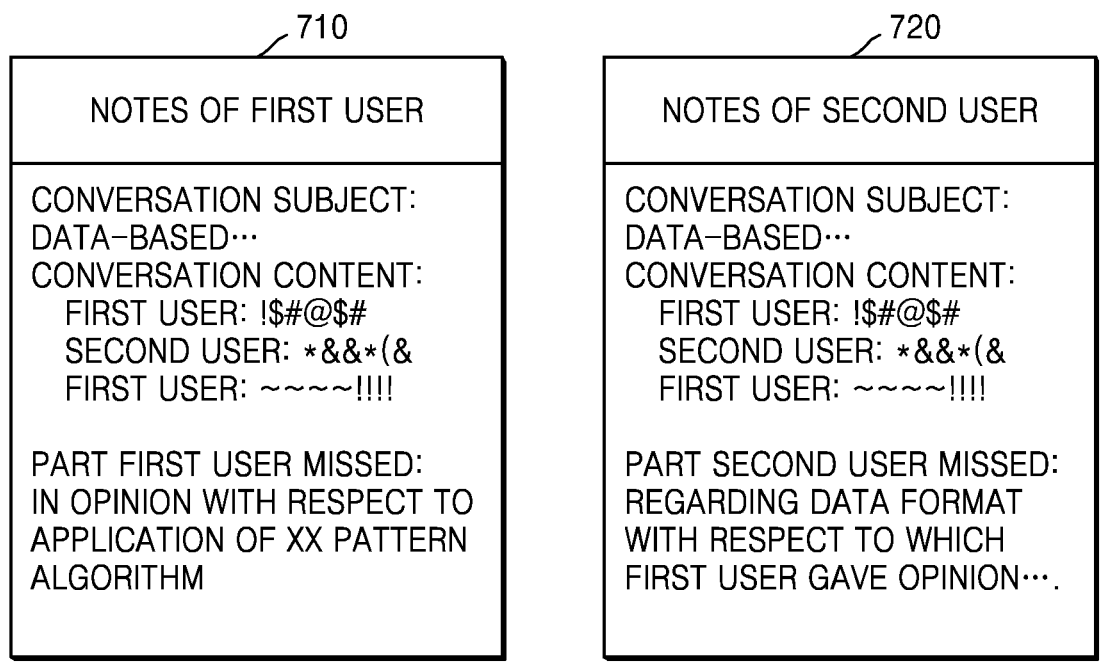
FIG. 7 is a view of notes for each user, according to an embodiment of the present disclosure.

FIG. 7 is a view of notes for each user, according to an embodiment of the present disclosure.

Referring to FIG. 7, based on an input of the first user, the device 1000 according to an embodiment may display notes 710 of the first user, which is generated in the device 1000. Similarly, based on an input of the second user, the other device 2000 according to an embodiment may display notes 720 of the second user, which is generated in the other device 2000.

According to an embodiment, the notes 710 of the first user and the notes 720 of the second user may commonly include reconstructed conversation content and a conversation subject. Also, according to an embodiment, the notes 710 of the first user may further include a portion in which an abnormal situation occurs, in which the first user does not understand a voice input of the second user, and the notes 720 of the second user may further include a portion in which an abnormal situation occurs, in which the second user does not understand a voice input of the first user. For example, the notes 710 of the first user is aimed to be used for reference regarding a conference, after the conference is completed, and may include only a portion that the first user does not understand, a portion that the first user wrongly understands, or a portion that the first user does not hear, from among conversation content exchanged between users.

Figure 8:
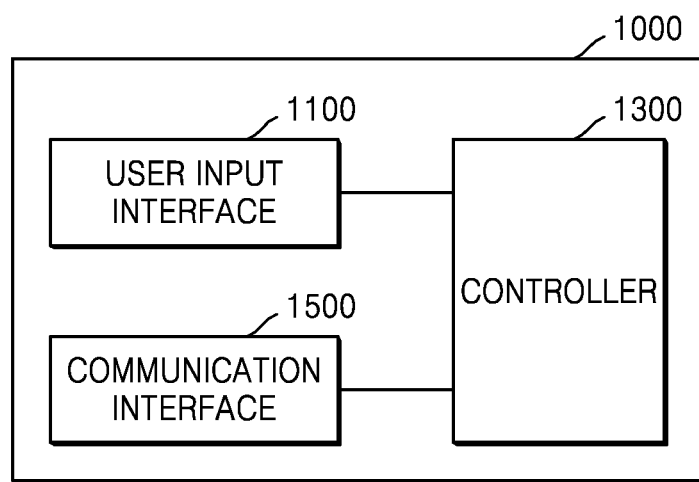
FIGS. 8 and 9 are block diagrams of a device according to embodiments of the present disclosure.
Figure 9:
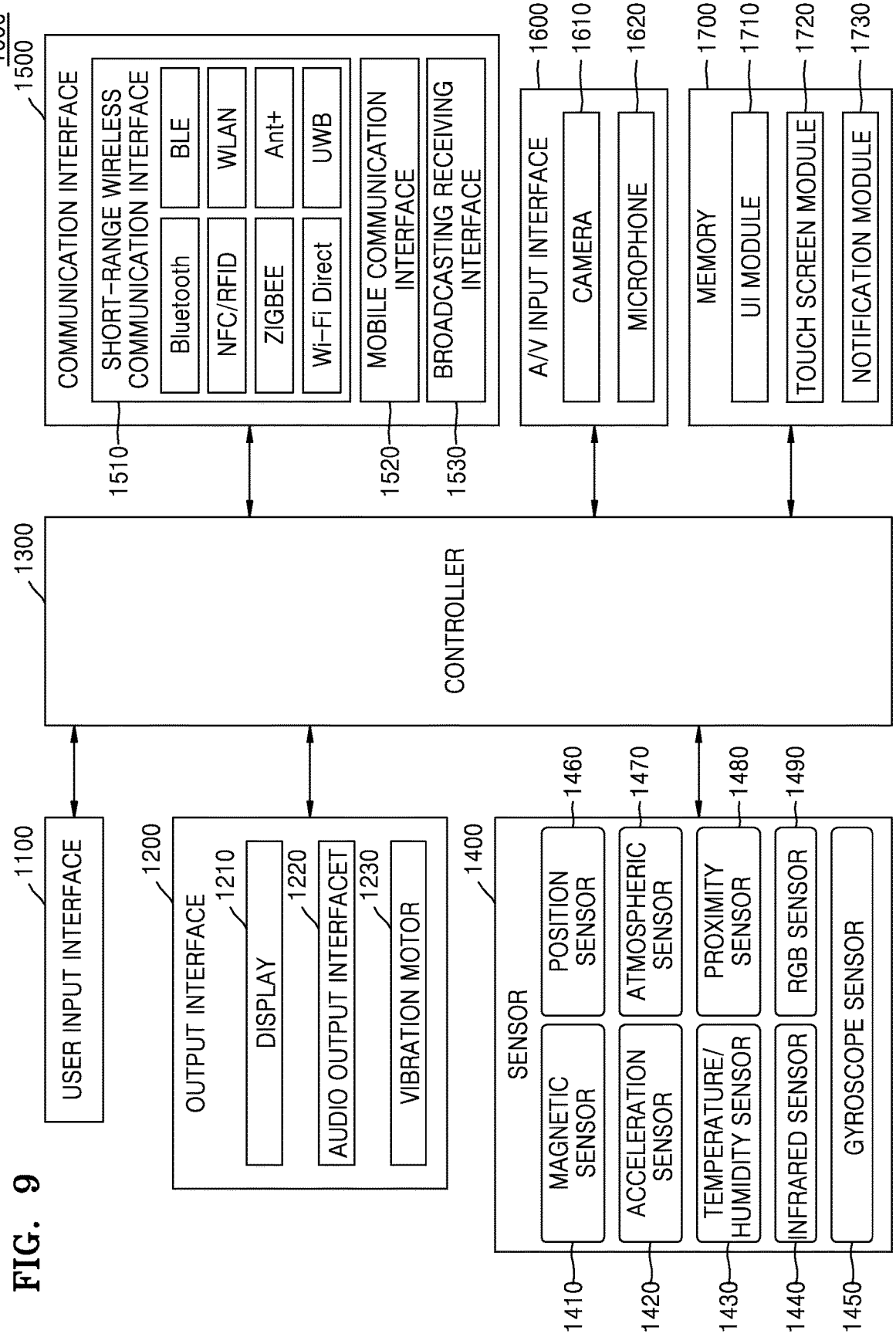

FIGS. 8 and 9 are block diagrams of a device according to embodiments of the present disclosure.

Referring to FIG. 8, the device 1000 according to an embodiment may include a user input interface 1100, a controller 1300, and a communication interface 1500. However, not all components illustrated in FIG. 8 are essential components. The device 1000 may be implemented by including more or less than the components illustrated in FIG. 8.

For example, referring to FIG. 9, the device 1000 according to an embodiment may further include an output interface 1200, a sensor 1400, an audio/video (A/V) input interface 1600, and a memory 1700, in addition to the user input interface 1100, the controller 1300, and the communication interface 1500.

The user input interface 1100 refers to a device via which a user inputs data for controlling the device 1000. For example, the user input interface 1100 may include a key pad, a dome switch, a touch pad (using a touch capacitance method, a pressure resistance method, an infrared sensing method, a surface ultrasonic conductive method, an integral tension measuring method, a piezo effect method, etc.), a jog wheel, a jog switch, etc., but is not limited thereto.

The user input interface 1100 may obtain a voice input which is input by the user.

The output interface 1200 may output an audio signal, a video signal, or a vibration signal, and may include a display 1210, a sound output interface 1220, and a vibration motor 1230.

The display 1210 may display and output information processed in the device 1000. For example, when an abnormal situation occurs, the display 1210 may display a check message for checking whether recognition information indicates a meaning of the voice input. Also, for example, the display 1210 may display a notification message generated based on the recognition information, in order to notify a voice input of another user that the user doesn't understand.

The sound output interface 1220 may output audio data received from the communication interface 1500 or stored in the memory 1700. Also, the sound output interface 1220 may output a sound signal (for example, a call signal reception sound, a message reception sound, a notification sound) related to functions performed in the device 1000. For example, the sound output interface 1220 may output a voice signal of the other user, which is received from the other device 2000.

The controller 1300 may control general operations of the device 1000, in general. For example, the controller 1300 may generally control the user input interface 1100, the output interface 1200, the sensor 1400, the communication interface 1500, the A/V input interface 1600, etc., by executing programs stored in the memory 1700. Also, the controller 1300 may perform the functions of the device 1000 illustrated in FIGS. 1, 2, 3, 4, 5, 6, and 7, by executing the programs stored in the memory 1700. The controller 1300 may include at least one processor. The controller 1300 may include a plurality of processors or an integrated one processor, based on functions and operations thereof.

According to an embodiment, the controller 1300 may obtain recognition information indicating a meaning of the voice input of the user, which is obtained via the user input interface 1100, and may determine whether an abnormal situation occurs, in which the other user of the other device 2000 does not understand the voice input of the user. According to an embodiment, the controller 1300 may obtain an AI voice recognition model to interpret the voice input of the user and may use the AI voice recognition model to generate text indicating the meaning of the voice input of the user. Also, according to an embodiment, the controller 1300 may correct the recognition information, based on a user input for correcting the recognition information, which is generated in response to a check message displayed.

According to an embodiment, the controller 1300 may determine whether the abnormal situation occurs, by analyzing at least one voice input of the other user, which is received from the other device 2000. Also, according to an embodiment, the controller 1300 may convert the at least one voice input of the other user into text, and may determine whether the abnormal situation occurs, based on whether the converted text includes a predetermined phrase. Also, according to an embodiment, the controller 1300 may determine whether the abnormal situation occurs, by receiving, from the other device 200, a request of the recognition information indicating the meaning of the voice input of the user. Also, according to an embodiment, the controller 1300 may analyze content of a conversation between the user and the other user based on the recognition information indicating the meaning of the voice input of the user and recognition information indicating a meaning of a voice input of the other user, and may determine whether the abnormal situation occurs, based on the analyzed content of the conversation.

According to an embodiment, based on a result of the determination, the controller 1300 may control the communication interface 1500 to transmit the obtained recognition information to the other device 2000. For example, when the controller 1300 determines that the abnormal situation occurs, the controller 1300 may control the communication interface 1600 to transmit the obtained recognition information to the other device 2000. Also, when the controller 1300 determines that the abnormal situation does occur, the controller 1300 may control the communication interface 1500 not to instantly transmit the recognition information to the other device 2000.

According to an embodiment, the controller 1300 may learn a reference for converting the voice input of the user into text, based on the recognition information corrected by the user.

According to an embodiment, the controller 1300 may reconstruct content of the conversation, based on a conversation log of the user, which is stored in the memory 1700, and a conversation log of the other user, which is received from the other device 2000 via the communication interface 1500. Also, according to an embodiment, the controller 1300 may determine a subject of the conversation by analyzing the reconstructed content of the conversation. Also, according to an embodiment, the controller 1300 may extract, from the reconstructed content of the conversation, a portion in which the abnormal situation occurs, in which the user does not understand the voice input of the other user, which is received from the other device 2000. Also, according to an embodiment, the controller 1300 may generate notes including at least one of the reconstructed content of the conversation, the subject of the conversation, and the portion in which the abnormal situation occurs.

The sensor 1400 may sense a state of the device 1000, a state of the user, or a state around the device 1000, and may transmit sensed information to the controller 1300.

The sensor 1400 may include at least one of a magnetic sensor 1410, an acceleration sensor 1420, a temperature/humidity sensor 1430, an infrared sensor 1440, a gyroscope sensor 1450, a position sensor (for example, GPS) 1460, an atmospheric sensor 1470, a proximity sensor 1480, and a red, green and blue (RGB) sensor 1490, but is not limited thereto. A function of each sensor may be intuitively inferred by one of ordinary skill in the art from its name, and thus, its detailed description will be omitted.

The communication interface 1500 may include at least one component configured to enable the device 1000 to communicate with the other device 2000 and a server. The other device 2000 may be a computing device, like the device 1000, but is not limited thereto. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy communication interface, a NFC interface, a WLAN (Wi-Fi) communication interface, a Zigbee communication interface, an IrDA communication interface, a WFD communication interface, a UWB communication interface, an Ant+ communication interface, etc., but is not limited thereto.

The mobile communication interface 1520 may transmit and receive a wireless signal to and from at least one of a base station, an external terminal, and a server, in a mobile communication network. The wireless signal may include a voice call signal, a videotelephony call signal, or data of various types based on exchanging of text/multimedia messages.

The broadcasting receiving interface 1530 may receive a broadcasting signal and/or information related to broadcasting from the outside, via a broadcasting channel. The broadcasting channel may include a satellite channel and a ground-wave channel According to embodiments, the device 1000 may not include the broadcasting receiving interface 1530.

According to an embodiment, the communication interface 1500 may transmit the voice input of the user, which is obtained from the user input interface 1100, to the other device 2000, and may receive the user input of the other user from the other device 2000.

Also, according to an embodiment, based on a result of determining whether the abnormal situation occurs, the communication interface 1500 may transmit the recognition information indicating the meaning of the voice input of the user to the other device 2000, and may receive the recognition information indicating the meaning of the voice input of the other user from the other device 2000.

Also, according to an embodiment, the communication interface 1500 may receive a request for the recognition information indicating the meaning of the voice input of the user from the other device 2000, and may transmit a request for the recognition information indicating the meaning of the voice input of the other user to the other device 2000.

The A/V input interface 1600 is configured to input an audio signal or a video signal, and may include a camera 1610, a microphone 1620, etc. The camera 1610 may obtain an image frame, such as a still image or a video, via an image sensor, in a videotelephony mode or a photographing mode. The image captured by the image sensor may be processed by the controller 1300 or an additional image processor (not shown).

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1700 may store programs for the processing and controlling operations of the controller 1300, and may store data that is input to the device 1000 or output from the device 1000.

According to an embodiment, the memory 1700 may store the conversation log of the user.

The memory 1700 may include at least one type of storage medium from among a flash memory type, a hard disk type, a multimedia card micro type, a card type memory (for example, secure digital (SD) or extreme digital (XD) memory), random-access memory (RAM), static RAM (SRAM), read-only memory (ROM), electrically erasable programmable ROM (EEPROM), programmable ROM (PROM), magnetic memory, magnetic disk, and optical disk.

The programs stored in the memory 1700 may be divided into a plurality of modules based on their functions. For example, the programs may be divided into a user interface (UI) module 1710, a touch screen module 1720, and a notification module 1730.

The UI module 1710 may provide a specialized UI, a graphic user interface (GUI), etc., which are synchronized to the device 1000, for each application. The touch screen module 1720 may sense a touch gesture on a touch screen via the user, and transmit information related to the touch gesture to the controller 1300. The touch screen module 1720 according to an embodiment may recognize and analyze a touch code. The touch screen module 1720 may be implemented as additional hardware including a controller.

The notification module 1730 may generate a signal to notify occurrence of an event. Examples of the event occurring in the device 1000 may include call signal reception, message reception, key signal input, schedule notification, etc. The notification module 1730 may output the notification signal as a video signal via the display 1210, output the notification signal as an audio signal via the sound output interface 1220, or output the notification signal as a vibration signal via the vibration motor 1230.

Figure 10:
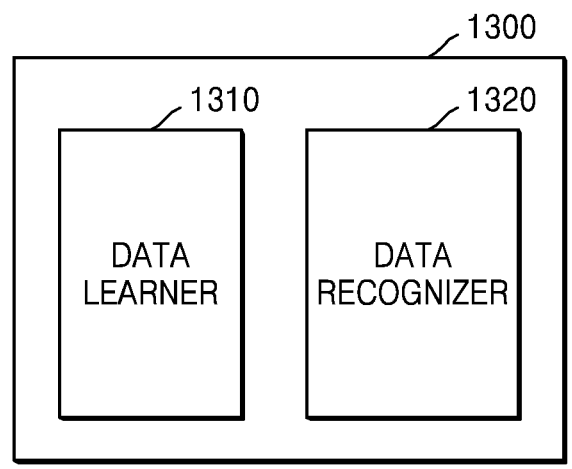
FIG. 10 is a block diagram of a controller according to an embodiment of the present disclosure.

FIG. 10 is a block diagram of a controller according to an embodiment of the present disclosure.

Referring to FIG. 10, the controller 1300 according to embodiments may include a data learner 1310 and a data recognizer 1320.

The data leaner 1310 may learn a reference for interpreting the voice input of the user and a reference for determining whether the abnormal situation occurs. The data learner 1310 may learn the reference with respect to which data to use to interpret the voice input of the user and how to interpret the voice input of the user by using the data. Also, the data learner 1310 may learn the reference with respect to which data to use to determine whether the abnormal situation occurs and how to determine whether the abnormal situation occurs by using the data. The data learner 1310 may obtain data to be used for learning and apply the obtained data to an AI voice recognition model to be described below, in order to learn the reference for interpreting the voice input of the user and the reference for determining whether the abnormal situation occurs.

According to an embodiment, the data to be used for learning may be the recognition information generated from the voice input of the user or the recognition information generated from the voice input of the other user. Also, according to an embodiment, the data to be used for learning may be the recognition information which is corrected in response to an input of the user to correct the recognition information.

The data recognizer 1320 may interpret the voice input of the user and determine whether the abnormal situation occurs, based on the data. The data recognizer 1320 may interpret the voice input of the user based on certain data by using the learned AI voice recognition model. Also, the data recognizer 1320 may recognize whether the abnormal situation occurs based on predetermined data by using the learned AI voice recognition model. The data recognizer 1320 may obtain predetermined data based on a reference which is predetermined based on learning, and use the AI voice recognition model by using the obtained data as an input, in order to interpret the voice input of the user based on the predetermined data. Also, the data recognizer 1320 may obtain predetermined data based on a reference which is predetermined based on learning, and use the AI voice recognition model by using the obtained data as an input, in order to determine whether the abnormal situation occurs based on the predetermine data. Also, an output of the AI voice recognition model based on the input, which is the obtained data, may be used to update the AI voice recognition model. At least one of the data learner 1310 and the data recognizer 1320 may be manufactured as at least one hardware chip and may be mounted in an electronic device. For example, at least one of the data learner 1310 and the data recognizer 1320 may be manufactured as an exclusive hardware chip for AI or as part of a previous general-purpose processor (for example, a central-processing unit (CPU) or an application processor) or a graphic exclusive processor (for example, a graphic-processing unit (GPU)), and may be mounted in various electronic devices described above.

In this case, the data learner 1310 and the data recognizer 1320 may be mounted in the same device or each may be mounted in a different device. For example, one of the data learner 1310 and the data recognizer 1320 may be included in a device, and the other may be included in a server 3000 (refer to FIG. 13). Also, the data learner 1310 and the data recognizer 1320 may be connected to each other in wires or wirelessly, so that model information established by the data learner 1310 may be provided to the data recognizer 1320, or data which is input to the data recognizer 1320 may be provided to the data learner 1310 as additional learning data.

At least one of the data leaner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, one or more software modules may be provided by an operating system (OS) or a predetermined application. Alternatively, some of the one or more software modules may be provided by the OS and the others may be provided by a predetermined application.

Figure 11:
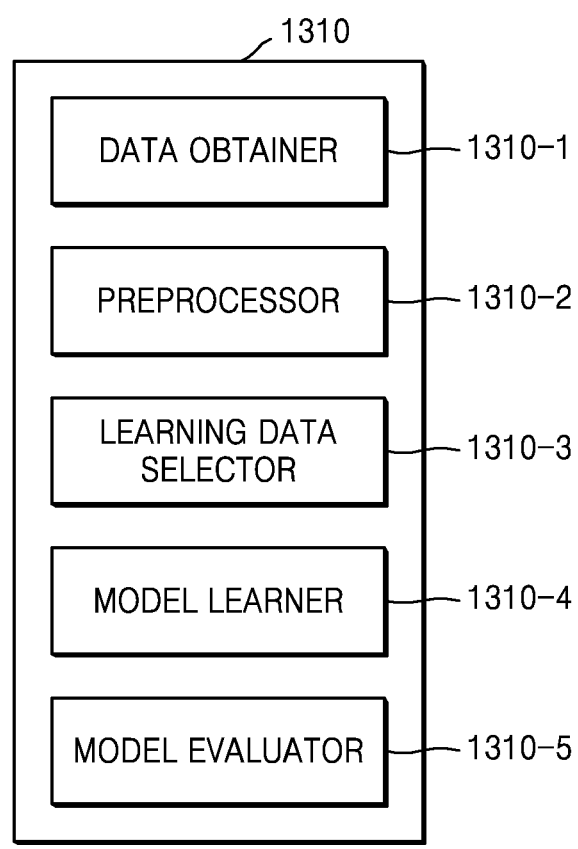
FIG. 11 is a block diagram of a data learner according to an embodiment of the present disclosure.

FIG. 11 is a block diagram of a data learner according to an embodiment of the present disclosure.

Referring to FIG. 11, the data learner 1310 according to embodiments may include a data obtainer 1310-1, a preprocessor 1310-2, a learning data selector 1310-3, a model learner 1310-4, and a model evaluator 1310-5.

The data obtainer 1310-1 may obtain data which is necessary to interpret the voice input of the user, reconstruct the content of the conversation, determine the subject of the conversation, determine whether the abnormal situation occurs, and generate the notes.

For example, the data obtainer 1310-1 may obtain voice data and text data. For example, the data obtainer 1310-1 may receive the data via an input device (for example, a microphone, etc.) of the device 1000. Alternatively, the data obtainer 1310-1 may obtain the data via an external device communicating with the device 1000. Alternatively, the data obtainer 131901 may obtain the data via the server 3000 communicating with the device 1000.

The data obtainer 1310-1 according to an embodiment may obtain the recognition information of the voice input, by using voice recognition techniques, such as ASR, SLU, NLU, etc.

The preprocessor 1310-2 may preprocess the obtained data so that the obtained data may be used for learning configured to interpret the voice input of the user and for learning configured to determine whether the abnormal situation occurs. The preprocessor 1310-2 may process the obtained data in a predetermined format so that the model learner 1310-4 to be described below may use the obtained data for learning configured to interpret the voice input of the user and for learning configured to determine whether the abnormal situation occurs.

The learning data selector 1310-3 may select data which is necessary for the learning, from the preprocessed data. The selected data may be provided to the model learner 1310-4. The learning data selector 1310-3 may select the data which is necessary for the learning, from the preprocessed data, based on a predetermined reference for interpreting the voice input of the user and a predetermined reference for determining whether the abnormal situation occurs. Also, the learning data selector 1310-3 may select the data, based on a reference that is predetermined based on the learning by the model learner 1310-4.

The model learner 1310-4 may learn the reference with respect to how to interpret the voice input of the user and how to determine whether the abnormal situation occurs, based on the learning data. Also, the model learner 1310-4 may learn the reference with respect to which learning data to use to interpret the voice input of the user. Also, the model learner 1310-4 may learn the reference with respect to which learning data to use to determine whether the abnormal situation occurs.

Also, the model learner 1310-4 may train the AI voice recognition model used to interpret the voice input of the user and determine whether the abnormal situation occurs, by using the learning data. In this case, the AI voice recognition model may be a pre-established model. For example, the AI voice recognition model may be a model that is pre-established by receiving basic learning data (for example, a sample voice input, etc.).

The AI voice recognition model may be established by taking into account a field in which the AI voice recognition model is implemented, a purpose of learning, a computer performance of a device, or the like. The AI voice recognition model may include, for example, a model based on a neural network. For example, models, such as deep neural network (DNN), recurrent neural network (RNN), and bidirectional recurrent deep neural network (BRDNN) may be used as the AI voice recognition model, but the present disclosure is not limited thereto.

According to various embodiments, when there are a plurality of pre-established AI voice recognition models, the model learner 1310-4 may determine an AI voice recognition model, of which basic learning data has high relativity with learning data that is input, as the AI voice recognition model for learning. In this case, the basic learning data may be pre-classified based on a type of data, and the AI voice recognition model may be pre-established based on a type of data. For example, the basic learning data may be pre-classified based on various references, such as a region in which the learning data is generated, a time in which the learning data is generated, a volume of the learning data, a genre of the learning data, a generator of the learning data, a type of an object in the learning data, etc.

Also, the model learner 1310-4 may train the AI voice recognition model, for example, by using learning algorithms, such as error back-propagation or gradient descent.

Also, the model learner 1310-4 may train the AI voice recognition model, for example, via supervised learning having learning data as an input. Also, the model learner 1310-4 may train the AI voice recognition model, for example, via unsupervised learning in which a reference for determining whether the abnormal situation occurs is discovered by learning, on its own, types of data which are necessary to determine whether the abnormal situation occurs, without instructions. Also, the model leaner 1310-4 may train the AI voice recognition model, for example, via reinforcement learning using feedback with respect to whether a result of determining whether the abnormal situation occurs, based on the learning, is correct.

Also, when the AI voice recognition model is learned, the model learner 1310-4 may store the learned AI voice recognition model. In this case, the model learner 1310-4 may store the learned AI voice recognition model in a memory of a device including the data recognizer 1320. Alternatively, the model learner 1310-4 may store the learned AI voice recognition model in a memory of the server 3000 connected with the device via a wired or wireless network.

In this case, for example, the memory in which the learned AI voice recognition model is stored may also store a command or data associated with at least one another component of the device. Also, the memory may store software and/or a program. The program may include, for example, kernel, middleware, an application programming interface (API), and/or an application program (or an "application").

The model evaluator 1310-5 may input evaluation data to the AI voice recognition model, and when a result of recognition, which is output from the evaluation data, does not meet a predetermined reference, may allow the model learner 1310-4 to learn again. In this case, the evaluation data may be data which is predetermined for evaluating the AI voice recognition model.

For example, when the number or a ratio of pieces of the evaluation data, with respect to which the recognition results are not correct, from among the recognition results of the learned AI voice recognition model with respect to the evaluation data, is greater than a predetermined threshold value, the model evaluator 1310-5 may evaluate such a case as not meeting a predetermined reference criterion. For example, when the predetermined threshold value is defined as a rate of 2%, and when the learned AI voice recognition model outputs wrong recognition results with respect to more than 20 pieces of the evaluation data from among the total 1000 pieces of the evaluation data, the mode evaluator 1310-5 may evaluate that the learned AI voice recognition model is not appropriate.

When there are a plurality of learned AI voice recognition models, the model evaluator 1310-5 may evaluate whether each of the learned AI voice recognition models meets a predetermined reference criterion, and may determine a learned AI voice recognition model meeting the predetermined reference criterion as an ultimate AI voice recognition model. In this case, when there are a plurality of learned AI voice recognition models meeting the predetermined reference criterion, the model evaluator 1310-5 may determine any one or a predetermined number of learned AI voice recognition models as the ultimate AI voice recognition model, in a descending order of evaluation scores.

At least one of the data obtainer 1310-1, the preprocessor 1310-2, the learning data selector 1310-3, the model learner 1310-4, and the model evaluator 1310-5 in the data learner 1310 may be manufactured as at least one hardware chip and may be mounted in the device. For example, at least one of the data obtainer 1310-1, the preprocessor 1310-2, the learning data selector 1310-3, the model learner 1310-4, and the model evaluator 1310-5 may be manufactured as an exclusive hardware chip for AI or as part of a previous general-purpose processor (for example, a CPU or an application processor) or a graphic exclusive processor (for example, a GPU), and may be mounted in various electronic devices described above.

Also, the data obtainer 1310-1, the preprocessor 1310-2, the learning data selector 1310-3, the model learner 1310-4, and the model evaluator 1310-5 may be mounted in one device or each may be mounted in a different device. For example, some of the data obtainer 1310-1, the preprocessor 1310-2, the learning data selector 1310-3, the model learner 1310-4, and the model evaluator 1310-5 may be included in the device, and the others may be included in the server 3000.

Also, at least one of the data obtainer 1310-1, the preprocessor 1310-2, the learning data selector 1310-3, the model learner 1310-4, and the model evaluator 1310-5 may be implemented as a software module. When at least one of the data obtainer 1310-1, the preprocessor 1310-2, the learning data selector 1310-3, the model learner 1310-4, and the model evaluator 1310-5 is implemented as a software module (or a program module including instructions), the software module may be stored in a non-transitory computer-readable recording medium. Also, in this case, one or more software modules may be provided by an OS or a predetermined application. Alternatively, some of the one or more software modules may be provided by the OS and the others may be provided by a predetermined application.

Figure 12:
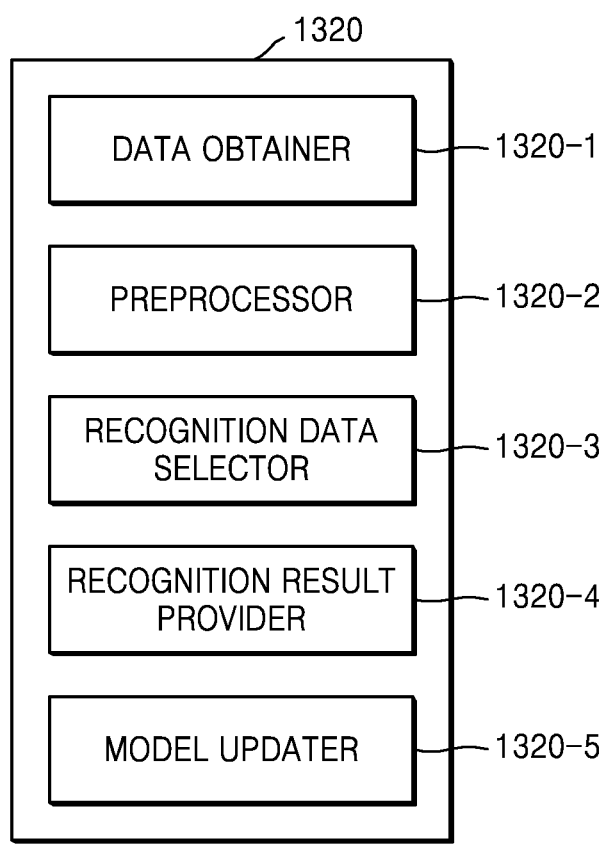
FIG. 12 is a block diagram of a data recognizer according to an embodiment of the present disclosure.

FIG. 12 is a block diagram of the data recognizer 1320 according to an embodiment of the present disclosure.

Referring to FIG. 12, the data recognizer 1320 according to some embodiments may include a data obtainer 1320-1, a preprocessor 1320-2, a recognition data selector 1320-3, a recognition result provider 1320-4, and a model updater 1320-5.

The data obtainer 1320-1 may obtain data which is necessary for interpreting the voice input of the user, reconstructing the content of the conversation, determining the subject of the conversation, determining whether the abnormal situation occurs, and generating the notes. The preprocessor 1320-2 may preprocess the obtained data so that the obtained data may be used to interpret the voice input of the user, reconstruct the content of the conversation, determine the subject of the conversation, determine whether the abnormal situation occurs, and generate the notes. The preprocessor 1320-2 may process the obtained data in a predetermined format so that the recognition result provider 1320-4 to be described below may use the obtained data to interpret the voice input of the user, reconstruct the content of the conversation, determine the subject of the conversation, determine whether the abnormal situation occurs, and generate the notes.

The recognition data selector 1320-3 may select data which is necessary to interpret the voice input of the user, reconstruct the content of the conversation, determine the subject of the conversation, determine whether the abnormal situation occurs, and generate the notes, from the preprocessed data. The selected data may be provided to the recognition result provider 1320-4. The recognition data selector 1320-3 may select part or all of the preprocessed data, based on a predetermined reference for interpreting the voice input of the user. Also, the recognition data selector 1320-3 may select part or all of the preprocessed data, based on a predetermined reference for determining whether the abnormal situation occurs. Also, the recognition data selector 1320-3 may select the data based on a reference predetermined based on the learning by the model learner 1310-4 described above.

The recognition result provider 1320-4 may apply the selected data to the AI voice recognition model, in order to interpret the voice input of the user and determine whether the abnormal situation occurs. The recognition result provider 1320-4 may provide a recognition result based on a purpose of data recognition. The recognition result provider 1320-4 may apply the selected data to the AI voice recognition model by using the data selected by the recognition data selector 1320-3 as an input. Also, the recognition result may be determined by the AI voice recognition model.

For example, the recognition result of the voice input of the user may be provided as text, audio, video, image, or commands (for example, an application execution command, a module function execution command, etc.). The recognition result provider 1320-4 may apply the recognition information generated from the voice input of the user, to the AI voice recognition model, in order to provide a recognition result of the recognition information. For example, the recognition result may be that the abnormal situation occurs, etc. For example, the recognition result provider 1320-4 may provide the recognition result that the abnormal situation occurs, as text, audio, video, image, or commands, etc. The model updater 1320-5 may allow the AI voice recognition model to be updated, based on an evaluation of the recognition result provided by the recognition result provider 1320-4. For example, the model updater 1320-5 may provide the recognition result provided by the recognition result provider 1320-4 to the model learner 1310-4 so that the model learner 1310-4 may update the AI voice recognition model.

At least one of the data obtainer 1320-1, the preprocessor 1320-2, the recognition data selector 1320-3, the recognition result provider 1320-4, and the model updater 1320-5 in the data recognizer 1320 may be manufactured as at least one hardware chip and may be mounted in the device. For example, at least one of the data obtainer 1320-1, the preprocessor 1320-2, the recognition data selector 1320-3, the recognition result provider 1320-4, and the model updater 1320-5 may be manufactured as an exclusive hardware chip for AI or as part of a previous general-purpose processor (for example, a CPU or an application processor) or a graphic exclusive processor (for example, a GPU), and may be mounted in various electronic devices described above.

Also, the data obtainer 1320-1, the preprocessor 1320-2, the recognition data selector 1320-3, the recognition result provider 1320-4, and the model updater 1320-5 may be mounted in one device or each may be mounted in a different device. For example, some of the data obtainer 1320-1, the preprocessor 1320-2, the recognition data selector 1320-3, the recognition result provider 1320-4, and the model updater 1320-5 may be included in the device, and the others may be included in the server 3000.

Also, at least one of the data obtainer 1320-1, the preprocessor 1320-2, the recognition data selector 1320-3, the recognition result provider 1320-4, and the model updater 1320-5 may be implemented as a software module. When at least one of the data obtainer 1320-1, the preprocessor 1320-2, the recognition data selector 1320-3, the recognition result provider 1320-4, and the model updater 1320-5 is implemented as a software module (or a program module including instructions), the software module may be stored in a non-transitory computer-readable recording medium. Also, in this case, one or more software modules may be provided by an OS or a predetermined application. Alternatively, some of the one or more software modules may be provided by the OS and the others may be provided by a predetermined application.

Figure 13:
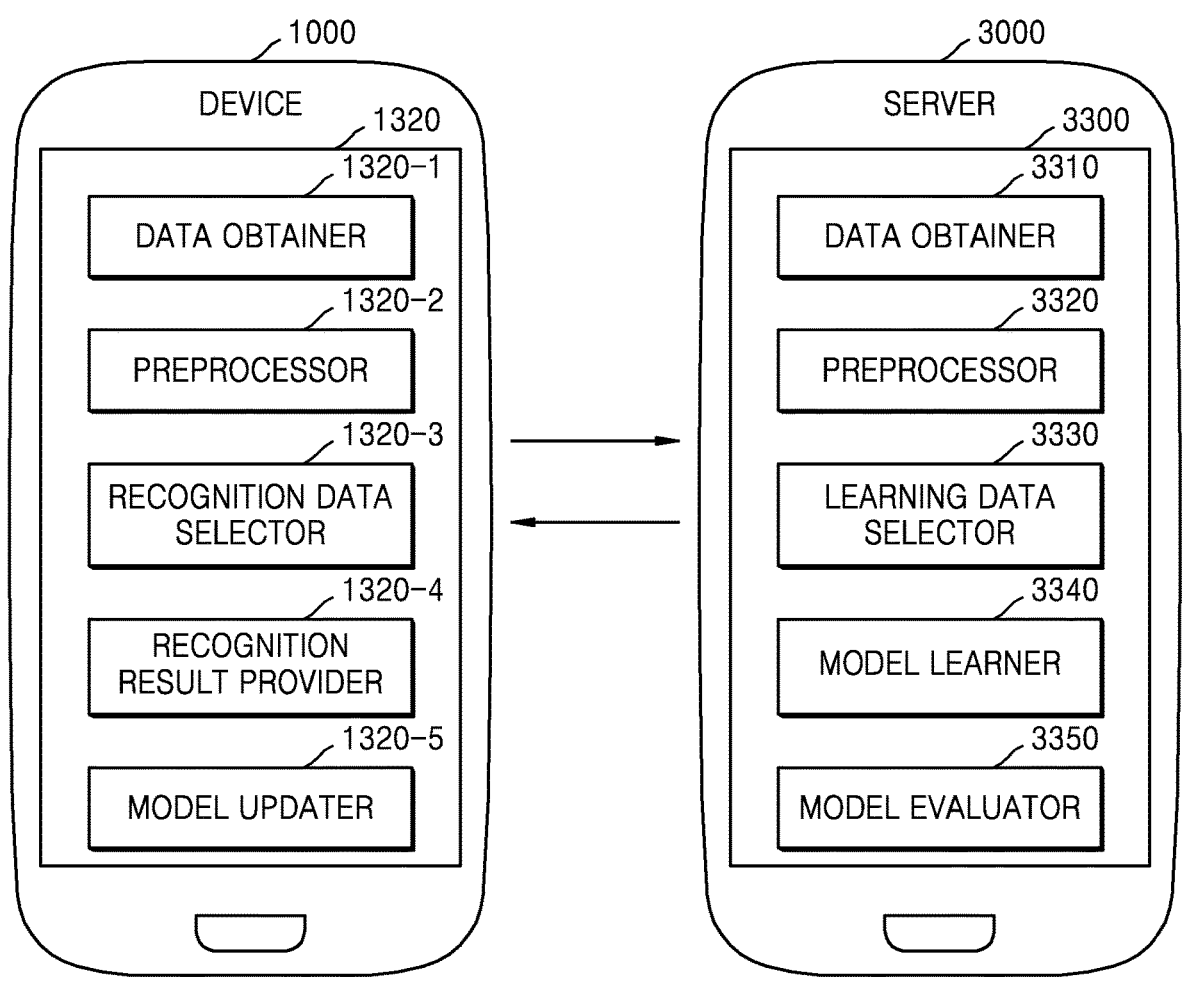
FIG. 13 is a view of an example in which a device and a server are synchronized to learn and recognize data, according to an embodiment of the present disclosure.

FIG. 13 is a view of an example in which a device and a server are synchronized to each other to learn and recognize data, according to an embodiment of the present disclosure.

Referring to FIG. 13, the server 3000 may learn the reference for interpreting the voice input of the user and the reference for determining whether the abnormal situation occurs, and the device 1000 may interpret the voice input of the user and determine whether the abnormal situation occurs based on a result of the learning of the server 3000. The server 3000 may include a data learner 3300 according to an embodiment. The data learner 3300 may include a data obtainer 33101, a preprocessor 3320, a learning data selector 3330, a model learner 3340, and a model evaluator 3350.

In this case, the model learner 3340 of the server 3000 may perform the function of the data learner 1310 illustrated in FIG. 11. The model learner 3340 of the server 3000 may learn the reference with respect to which data to use to interpret the voice input of the user and determine whether the abnormal situation occurs, and the reference with respect to how to interpret the voice input of the user and determine whether the abnormal situation occurs by using the data. The model learner 1340 may learn the reference for interpreting the voice input of the user and the reference for determining whether the abnormal situation occurs by obtaining data to be used for learning and applying the obtained data to the AI voice recognition model.

Also, the recognition result provider 1320-4 of the device 1000 may apply the data selected by the recognition data selector 1320-3 to the AI voice recognition model generated by the server 3000, in order to interpret the voice input of the user and determine whether the abnormal situation occurs. For example, the recognition result provider 1320-4 may transmit the data selected by the recognition data selector 1320-3 to the server 3000, and may request the server 3000 to apply the data selected by the recognition data selector 1320-3 to the AI voice recognition model in order to interpret the voice input of the user and determine whether the abnormal situation occurs. The recognition result provider 1320-4 may receive information with respect to the interpretation of the voice input performed by the server 3000, from the server 3000. Also, the recognition result provider 1320-4 may receive information about the determination via the server 3000 as to whether the abnormal situation occurs, from the server 3000. The device 1000 may transmit the voice input generated by the user to the server 3000. The server 3000 may analyze the voice input by using voice recognition techniques, such as ASR, SLU, NLU, etc. The server 3000 may analyze the voice input, and may generate the recognition information and transmit the recognition information to the device 1000. The device 1000 may receive the recognition information of the voice input, from the server 3000.

Alternatively, the recognition result provider 1320-4 of the device 1000 may receive the AI voice recognition model generated by the server 3000, from the server 3000, and may interpret the voice input of the user and determine whether the abnormal situation occurs by using the received AI voice recognition model. In this case, the recognition result provider 1320-4 of the device 1000 may interpret the voice input of the user and determine whether the abnormal situation occurs by applying the data selected by the recognition data selector 1320-3 to the AI voice recognition model received from the server 3000.

A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable medial, which have been implemented by an arbitrary method or technique, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

Also, in this specification, the "interface" may include a hardware component, such as a processor or a circuit, and/or a software component executed by the hardware component such as the processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:

a microphone;

a communication module configured to communicate with another device; and a controller configured to:

receive information of a first voice, through the communication module from the other device, obtain, through the microphone, information of a second voice as a response to the first voice received from the other device, analyze the obtained information related to the second voice, by an Artificial Intelligence model stored in the electronic device, identify a meaning of the obtained information of the second voice, and provide a text message regarding the received information of the first voice, based on the identified meaning.

2. The electronic device of claim 1, wherein the controller is further configured to:

obtain a first artificial intelligence (AI) voice recognition model configured to interpret the first voice, and generate the text message indicating the meaning of the first voice by using the first AI voice recognition model.

3. The electronic device of claim 2, wherein the first AI voice recognition model is generated in the electronic device and registered in the electronic device.

4. The electronic device of claim 2, wherein the first AI voice recognition model is generated in the other device and provided to the electronic device.

5. The electronic device of claim 1, wherein the controller is further configured to:

convert the second voice into text, and if a predetermined phrase is comprised in the converted text, provide a text message regarding the received information of the first voice.

6. The electronic device of claim 1, wherein the communication module is further configured to receive, from the other device, a request for the identified meaning of the obtained information of the second voice.

7. The electronic device of claim 6, wherein the communication module is further configured to transmit the identified meaning to the other device is in response to receiving, from the other device, the request for the identified meaning of the obtained information of the second voice.

8. The electronic device of claim 1, wherein the communication module is further configured to receive, from the other device, recognition information indicating a meaning of the first voice, and wherein the controller is further configured to:

analyze content of a conversation between user of the electronic device and a user of the other device based on the recognition information indicating the meaning of the first voice and the identified meaning, and determine, based on the analyzed content of the conversation, whether an abnormal situation occurs.

9. The electronic device of claim 1, further comprising:
a memory configured to store a conversation log of a user of the electronic device,
wherein the communication module is further configured to receive a conversation log of a user of the other device, from the other device, and
wherein the controller is further configured to:
reconstruct content of a conversation based on the stored conversation log of the user of the electronic device and the received conversation log of the user of the other device,
determine a subject of the conversation by analyzing the reconstructed content of the conversation,
extract, from the reconstructed content of the conversation, a portion in which an abnormal situation occurs, in which the user of the electronic device does not understand the first voice, and
generate notes comprising at least one of the reconstructed content of the conversation, the determined subject of the conversation, and the extracted portion in which the abnormal situation occurs.

10. A method, performed by a device an electronic device, of transmitting and receiving audio data to and from another device, the method comprising:
receiving information of a first voice, through a communication module from the other device;
obtaining, through a microphone, information of a second voice as a response to the first voice received from the other device;
analyzing the obtained information related to the second voice, by an Artificial Intelligence model stored in the electronic device;
identifying meaning of the obtained information of the second voice; and providing a text message regarding the received information of the first voice, based on the identified meaning.

11. The method of claim 10, further comprising:
obtaining a first artificial intelligence (AI) voice recognition model configured to interpret the first voice; and
generating the text message indicating the meaning of the first voice by using the first AI voice recognition model.

12. The method of claim 11, wherein the first AI voice recognition model is generated in the other device and provided to the electronic device.

13. The method of claim 11, wherein the first AI voice recognition model is generated in the electronic device and registered in the electronic device.

14. The method of claim 10, wherein the providing a text message regarding the received information of the first voice, based on the identified meaning comprises:
converting the second voice into text; and
if a predetermined phrase is comprised in the converted text, providing a text message regarding the received information of the first voice.

15. The method of claim 10, further comprising:
receiving, from the other device, a request for the identified meaning of the obtained information of the second voice.

16. The method of claim 15, further comprising:
transmitting of the identified meaning to the other device is in response to receiving, from the other device, the request for the identified meaning of the obtained information of the second voice.

17. The method of claim 10, further comprising:
receiving, from the other device, recognition information indicating a meaning of the first voice;
analyzing content of a conversation between a user of the electronic device and a user of the other device based on the recognition information indicating the meaning of the first voice and the identified meaning; and
determining, based on the analyzed content of the conversation, whether an abnormal situation occurs.

18. The method of claim 10, further comprising:
storing a conversation log of a user of the electronic device;
receiving a conversation log of a user of the other device, from the other device;
reconstructing content of a conversation based on the stored conversation log of the user of the electronic device and the received conversation log of the user of the other device;
determining a subject of the conversation by analyzing the reconstructed content of the conversation;
extracting, from the reconstructed content of the conversation, a portion in which an abnormal situation occurs, in which the user of the electronic device does not understand the first voice; and
generating notes comprising at least one of the reconstructed content of the conversation, the determined subject of the conversation, and the extracted portion in which the abnormal situation occurs.

19. A non-transitory computer-readable recording medium having embodied thereon a program for executing the method of claim 10.

* * * * *